(12) United States Patent
Zhou et al.

(10) Patent No.: US 12,538,364 B2
(45) Date of Patent: Jan. 27, 2026

(54) COMPUTING DATA TRANSMISSION METHOD AND APPARATUS

(71) Applicant: HUAWEI TECHNOLOGIES CO., LTD., Shenzhen (CN)

(72) Inventors: Yu Zhou, Shanghai (CN); Guojie Hu, Shenzhen (CN); Shuigen Yang, Shenzhen (CN); Yinghao Jin, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 18/183,274

(22) Filed: Mar. 14, 2023

(65) Prior Publication Data

US 2023/0224982 A1    Jul. 13, 2023

Related U.S. Application Data

(63) Continuation of application No. PCT/CN2021/111324, filed on Aug. 6, 2021.

(30) Foreign Application Priority Data

Sep. 21, 2020 (CN) .......................... 202010995014.7

(51) Int. Cl.
  *H04W 76/10* (2018.01)
  *H04W 8/24* (2009.01)
(52) U.S. Cl.
  CPC ............. *H04W 76/10* (2018.02); *H04W 8/24* (2013.01)
(58) Field of Classification Search
  None
  See application file for complete search history.

(56) References Cited

U.S. PATENT DOCUMENTS

| | | | |
|---|---|---|---|
| 2015/0003435 A1 | 1/2015 | Horn et al. | |
| 2019/0297634 A1 | 9/2019 | Dai et al. | |
| 2020/0229076 A1* | 7/2020 | Jin | H04W 48/14 |
| 2021/0076196 A1* | 3/2021 | Kumar | H04W 72/51 |
| 2021/0219375 A1* | 7/2021 | Kim | H04W 76/27 |

(Continued)

FOREIGN PATENT DOCUMENTS

| | | |
|---|---|---|
| CN | 102282905 A | 12/2011 |
| CN | 105589506 A | 5/2016 |

(Continued)

OTHER PUBLICATIONS

Extended European Search Report issued in corresponding European Application No. 21868337.3, dated Feb. 2, 2024, pp. 1-12.

(Continued)

*Primary Examiner* — Derrick W Ferris
(74) *Attorney, Agent, or Firm* — HAUPTMAN HAM, LLP

(57) ABSTRACT

This application provides a computing data transmission method and apparatus, to transmit computing data such as a computing model. The method includes: A terminal device sends a first message to an access network device, where the first message requests the access network device to set up a first radio bearer, and the first radio bearer carries computing data. The terminal device receives a second message sent by the access network device, and sets up the first radio bearer based on radio bearer configuration information carried in the second message.

18 Claims, 18 Drawing Sheets

(56) References Cited

U.S. PATENT DOCUMENTS

| | | | |
|---|---|---|---|
| 2021/0235535 A1* | 7/2021 | Hori | H04W 76/30 |
| 2022/0225144 A1* | 7/2022 | Virtej | H04W 24/10 |
| 2022/0287102 A1* | 9/2022 | Futaki | H04W 74/0833 |
| 2023/0188992 A1* | 6/2023 | Schliwa-Bertling | H04W 12/10 726/6 |
| 2023/0276227 A1* | 8/2023 | Jin | H04W 8/24 370/328 |

FOREIGN PATENT DOCUMENTS

| | | |
|---|---|---|
| CN | 109548085 A | 3/2019 |
| CN | 109587824 A | 4/2019 |
| CN | 109729603 A | 5/2019 |
| CN | 110225600 A | 9/2019 |
| CN | 110300458 A | 10/2019 |
| CN | 110677921 A | 1/2020 |
| EP | 3512245 A1 | 7/2019 |
| EP | 4192185 A1 | 6/2023 |
| WO | 2015113212 A1 | 8/2015 |
| WO | 2017020302 A1 | 2/2017 |

OTHER PUBLICATIONS

Motorola, Layer 1 parameters—location within RRC signalling. 3GPP TSG-RAN WG2#61, Sorrento, Italy. Feb. 11-15, 2008, R2-081129, 11 pages.

3GPP TS 38.413 V16.2.0 (Jul. 2020), 3rd Generation Partnership Project; Technical Specification Group Radio Access Network; NG-RAN; NG Application Protocol (NGAP)(Release 16), 462 pages.

3GPP TS 38.331 V16.1.0 (Jul. 2020), 3rd Generation Partnership Project; Technical Specification Group Radio Access Network; NR; Radio Resource Control (RRC) protocol specification(Release 16), 906 pages.

3GPP TS 38.323 V16.1.0 (Jul. 2020), 3rd Generation Partnership Project; Technical Specification Group Radio Access Network; NR; Packet Data Convergence Protocol (PDCP) specification (Release 16), 40 pages.

\* cited by examiner

COMPUTING DATA TRANSMISSION METHOD AND APPARATUS

CROSS-REFERENCE TO RELATED APPLICATION

This application is a continuation of International Application No. PCT/CN2021/111324, filed on Aug. 6, 2021, which claims priority to Chinese Patent Application No. 202010995014.7, filed on Sep. 21, 2020. The disclosures of the aforementioned applications are hereby incorporated by reference in their entireties.

TECHNICAL FIELD

This application relates to the field of communication technologies, and in particular, to a computing data transmission method and apparatus.

BACKGROUND

With the development of services such as artificial intelligence and virtual reality (VR)/mobile application augmented reality (AR), new computing requirements, for example, artificial intelligence (AI) computing (including computing required by AI model training and inference) and real-time rendering computing of VR services with device-edge-cloud synergy, are derived from wireless communication networks. Centering on these new computing requirements, service flows such as computing task splitting, computing resource management and scheduling collaboration, and AI model distribution are related. In this process, computing data such as a computing-related negotiation interaction message, computing task splitting data, data for describing a computing model (such as an AI model), and data generated by the computing model is generated.

For example, intelligent computing in fields such as a physical layer, media access control, radio resource control, radio resource management, and operation and maintenance needs to be performed between a terminal device and a wireless network. Therefore, computing data, for example, data related to a computing model used for intelligent computing, exists between the terminal device and an access network device. The computing model may be a machine learning (ML) model or the like.

The computing data may be generated by the access network device, a core network device, an operation and maintenance server, or the like, and then sent by the access network device to the terminal device. Currently, manners in which a network side sends data to a terminal side mainly include signaling radio bearer (SRB) transmission and data radio bearer (DRB) transmission.

However, due to limitations of transmission characteristics (for example, a maximum amount of supported transmitted data and a quality of service (QoS) level) of an SRB and a DRB, the SRB and the DRB are not applicable to transmission of the computing data. Therefore, how to transmit the computing data is a problem to be resolved urgently.

SUMMARY

This application provides a computing data transmission method and apparatus, to transmit computing data.

According to a first aspect, an embodiment of this application provides a computing data transmission method. The method includes: A terminal device sends a first message to an access network device, where the first message is used to request the access network device to set up a first radio bearer, and the first radio bearer is used to carry computing data. The terminal device receives a second message sent by the access network device, and sets up the first radio bearer based on radio bearer configuration information carried in the second message, where the second message carries the radio bearer configuration information.

In this embodiment of this application, the terminal device and the access network device support setup of the first radio bearer used to transmit the computing data, so that the terminal device and the access network device can implement transmission of the computing data such as a computing model through the first radio bearer. The computing data is transmitted through the first radio bearer, so that transmission of the computing data may not be limited by SRB transmission, DRB transmission, or application layer transmission.

In a possible design, the first message may be a radio resource control (RRC) setup complete (RRCSetupComplete) message, and the second message may be RRC reconfiguration (RRC Reconfiguration). In the foregoing manner, support for the first radio bearer used to transmit the computing data is added on a basis of an RRC reconfiguration procedure, so that the terminal device can set up the first radio bearer when entering a connected state from an idle state, and further transmit the computing data through the first radio bearer.

In a possible design, the radio bearer configuration information may include a packet data convergence protocol (PDCP) configuration (for example, an ordering delivery timer) of the first radio bearer, a radio link control (RLC) mode (for example, acknowledged or unacknowledged) of the first radio bearer, an uplink and downlink RLC layer configuration (for example, a sequence number field length and a retransmission timer) of the first radio bearer, a logical channel identifier and a priority configuration of the first radio bearer, and the like. According to the foregoing design, a PDCP layer of the terminal device may set up the first radio bearer based on the PDCP configuration.

In a possible design, after setting up the first radio bearer based on the radio bearer configuration information, the terminal device may send first computing data to the access network device through the first radio bearer. According to the foregoing design, the terminal device may send the computing data to the access network device.

In a possible design, after the terminal device sets up the first radio bearer based on the radio bearer configuration information, the terminal device may receive, through the first radio bearer, second computing data sent by the access network device. According to the foregoing design, the access network device may send the computing data to the terminal device.

In a possible design, after the terminal device sets up the first radio bearer based on the radio bearer configuration information, the terminal device may receive a third message sent by the access network device, where the third message is used to release the first radio bearer; and the terminal device releases the first radio bearer. According to the foregoing design, the terminal device may release the first radio bearer based on an indication of the access network device, thereby saving communication resources.

In a possible design, the third message is an RRC release message. In the foregoing design, when entering the idle state, the terminal device releases the first radio bearer, so that communication resources can be saved.

In a possible design, after the terminal device sets up the first radio bearer based on the radio bearer configuration information, the terminal device may receive a fourth message sent by the access network device, where the fourth message is used to deactivate the first radio bearer; and the terminal device deactivates the first radio bearer. According to the foregoing design, the terminal device may deactivate the first radio bearer based on an indication of the access network device, thereby saving communication resources.

In a possible design, the fourth message may be an RRCRelease message that carries a suspend configuration (suspendConfig) information element, and the suspendConfig information element indicates the terminal device to suspend (or deactivate) an RRC connection. In the foregoing design, when entering an inactive state, the terminal device deactivates the first radio bearer, so that communication resources can be saved.

In a possible design, after the terminal device deactivates the first radio bearer, the terminal device may send a fifth message to the access network device, where the fifth message is used to request the access network device to activate the first radio bearer; the terminal device receives a sixth message sent by the access network device, where the sixth message indicates the terminal device to activate the first radio bearer; and the terminal device activates the first radio bearer. According to the foregoing design, the terminal device may reactivate the first radio bearer based on a requirement of the terminal device, to transmit the computing data.

In a possible design, the fifth message may be an RRC resume request (RRCResumeRequest) message, and the sixth message may be an RRC resume (RRCResume) message. In the foregoing manner, when the terminal device in the inactive state needs to send the computing data, the terminal device resumes the first radio bearer between the terminal device and the access network device by using an RRC resume procedure, so that the computing data (for example, an ML model) can be sent to the access network device through the first radio bearer.

In a possible design, after the terminal device deactivates the first radio bearer, the terminal device may further receive a third message sent by the access network device, where the third message indicates the terminal device to release the first radio bearer; and the terminal device releases the first radio bearer. According to the foregoing design, after deactivating the first radio bearer, the terminal device may further release the first radio bearer based on an indication of the access network device.

In a possible design, the third message is an RRC release message. In the foregoing design, when entering the idle state from the inactive state, the terminal device releases the first radio bearer, so that communication resources can be saved.

In a possible design, before the terminal device receives the radio bearer configuration information sent by the access network device, the terminal device may report capability information to the access network device, where the capability information indicates that the terminal device supports the first radio bearer. According to the foregoing design, the access network device may determine, based on the capability information of the terminal device, whether to set up the first radio bearer to the terminal device.

In a possible design, before the terminal device reports the capability information to the access network device, the terminal device receives a seventh message sent by the access network device, where the seventh message is used to enquire whether the terminal device supports the first radio bearer. According to the foregoing design, the access network device may actively enquire the capability information from the terminal device.

In a possible design, the seventh message may be a user equipment (UE) capability enquiry message. In the foregoing manner, a small change to a protocol may be made.

In a possible design, the first radio bearer may be a computing radio bearer (CRB).

According to a second aspect, an embodiment of this application provides a computing data transmission method. The method includes: An access network device receives a first message sent by a terminal device, and sends a second message to the terminal device after receiving the first message. The first message is used to request the access network device to set up a first radio bearer, the first radio bearer is used to carry computing data, and the second message carries radio bearer configuration information.

In this embodiment of this application, the terminal device and the access network device support setup of the first radio bearer used to transmit the computing data, so that the terminal device and the access network device can implement transmission of the computing data such as a computing model through the first radio bearer, and transmit the computing data through the first radio bearer. Therefore, transmission of the computing data may not be limited by SRB transmission, DRB transmission, and application layer transmission.

In a possible design, the first message may be an RRCSetupComplete message, and the second message may be an RRCReconfiguration message. In the foregoing manner, support for the first radio bearer used to transmit the computing data is added on a basis of an RRC reconfiguration procedure, so that the terminal device can set up the first radio bearer when entering a connected state from an idle state, and further transmit the computing data through the first radio bearer.

In a possible design, the radio bearer configuration information may include a PDCP configuration (for example, an ordering delivery timer) of the first radio bearer, an RLC mode (for example, acknowledged or unacknowledged) of the first radio bearer, an uplink and downlink RLC layer configuration (for example, a sequence number field length and a retransmission timer) of the first radio bearer, a logical channel identifier and a priority configuration of the first radio bearer, and the like. According to the foregoing design, a PDCP layer of the terminal device may set up the first radio bearer based on the PDCP configuration.

In a possible design, after the access network device sends the second message to the terminal device, the access network device may receive first computing data that is sent by the terminal device through the first radio bearer. According to the foregoing design, the terminal device may send the computing data to the access network device.

In a possible design, after the access network device sends the second message to the terminal device, the access network device may send second computing data to the terminal device through the first radio bearer. According to the foregoing design, the access network device may send the computing data to the terminal device.

In a possible design, after the access network device sends the second message to the terminal device, the access network device may send a third message to the terminal device, where the third message is used to release the first radio bearer. According to the foregoing design, the terminal device may release the first radio bearer based on an indication of the access network device, thereby saving communication resources.

In a possible design, the third message is an RRC release message. In the foregoing design, when entering the idle state, the terminal device releases the first radio bearer, so that communication resources can be saved.

In a possible design, after the access network device sends the second message to the terminal device, the access network device may send a fourth message to the terminal device, where the fourth message is used to deactivate the first radio bearer. According to the foregoing design, the terminal device may deactivate the first radio bearer based on an indication of the access network device, thereby saving communication resources.

In a possible design, the fourth message may be an RRCRelease message that carries a suspendConfig information element, and the suspendConfig information element indicates the terminal device to suspend (or deactivate) an RRC connection. In the foregoing design, when entering an inactive state, the terminal device deactivates the first radio bearer, so that communication resources can be saved.

In a possible design, after the access network device sends the fourth message to the terminal device, the access network device may receive a fifth message sent by the terminal device, where the fifth message is used to request the access network device to activate the first radio bearer; and the access network device sends a sixth message to the terminal device, where the sixth message indicates the terminal device to activate the first radio bearer. According to the foregoing design, the terminal device may reactivate the first radio bearer based on a requirement of the terminal device, to transmit the computing data.

In a possible design, the fifth message may be an RRCResumeRequest message, and the sixth message may be an RRCResume message. In the foregoing manner, when the terminal device in the inactive state needs to send the computing data, the terminal device resumes the first radio bearer between the terminal device and the access network device by using an RRC resume procedure, so that the computing data (for example, an ML model) can be sent to the access network device through the first radio bearer.

In a possible design, after the access network device sends the fourth message to the terminal device, the access network device may send a third message to the terminal device, where the third message indicates the terminal device to release the first radio bearer. According to the foregoing design, after the terminal device deactivates the first radio bearer, the access network device may indicate the terminal device to release the first radio bearer.

In a possible design, the third message is an RRC release message. In the foregoing design, when entering the idle state from the inactive state, the terminal device releases the first radio bearer, so that communication resources can be saved.

In a possible design, before the access network device sends the second message to the terminal device, the access network device may receive capability information reported by the terminal device, where the capability information indicates that the terminal device supports the first radio bearer. According to the foregoing design, the access network may determine, based on the capability information of the terminal device, whether to set up the first radio bearer to the terminal device.

In a possible design, before the access network device receives the capability information reported by the terminal device, the access network device may send a seventh message to the terminal device, where the seventh message is used to enquire whether the terminal device supports the first radio bearer. According to the foregoing design, the access network device may actively enquire the capability information from the terminal device.

In a possible design, the first radio bearer may be a CRB.

According to a third aspect, an embodiment of this application provides a terminal device. The terminal device includes at least one of the following modules: a first module or a second module. The first module is configured to process computing data between the terminal device and an access network device, and the second module is configured to process computing data between the terminal device and a core network device.

In a possible design, the first module and the second module are a same module.

In a possible design, the first module may be configured to implement functions such as computing data collection, computing model training, computing model generation, computing model update, and computing model distribution between the terminal device and the access network device.

In a possible design, the second module may be configured to implement functions such as computing data collection, computing model training, computing model generation, computing model update, and computing model distribution between the terminal device and the core network device.

According to a fourth aspect, an embodiment of this application provides a terminal device. The terminal device includes at least one of the following two protocol layers: a first protocol layer or a second protocol layer. The first protocol layer is used to process (for example, collect and distribute) computing data between the terminal device and an access network device, and the second protocol layer is used to process (for example, collect and distribute) computing data between the terminal device and a core network.

In a possible design, the terminal device may further include a PDCP layer. The PDCP layer is used to: set up a first radio bearer used to transmit the computing data, and transmit the computing data through the first radio bearer.

According to a fifth aspect, an embodiment of this application provides an access network device. The access network device includes a functional module configured to process computing data between a terminal device and the access network device.

In a possible design, the functional module may be configured to implement functions such as computing data collection, computing model training, computing model generation, computing model update, and computing model distribution between the terminal device and the access network device.

In a possible design, if the access network device includes a central unit (CU) and at least one distributed unit (DU), the functional module may be connected to the CU through a G1 interface, and may be connected to the DU through a G1 interface.

In a possible design, if the CU includes a control plane (CU-CP) and a user plane (CU-UP), the functional module may be connected to the CU-CP of the CU through a G1 interface.

In a possible design, the functional module may alternatively be deployed in the CU, the CU-CP, or the DU.

According to a sixth aspect, an embodiment of this application provides an access network device. The access network device includes a PDCP layer. The PDCP layer is used to: set up a first radio bearer used to transmit computing data, and transmit the computing data through the first radio bearer.

In a possible design, the access network device may further include a first protocol layer used to process (for example, collect and distribute) computing data between a terminal device and the access network device.

According to a seventh aspect, an embodiment of this application provides a core network device. The core network device includes a functional module configured to process computing data between a terminal device and the core network device.

In a possible design, the functional module may be configured to implement functions such as computing data collection, computing model training, computing model generation, computing model update, and computing model distribution between the terminal device and the core network device.

According to an eighth aspect, an embodiment of this application provides a core network device. The core network device includes a second protocol layer used to process (for example, collect and distribute) computing data between a terminal device and the core network device.

According to a ninth aspect, an embodiment of this application provides a communication system. The communication system includes the terminal device according to the fourth aspect and the access network device according to the sixth aspect, and may further include the core network device according to the eighth aspect.

According to a tenth aspect, this application provides a computing data transmission apparatus. The apparatus may be a communication device, or may be a chip or a chip set in the communication device. The communication device may be a terminal device, or may be an access network device. The apparatus may include a processing unit and a transceiver unit. When the apparatus is a communication device, the processing unit may be a processor, and the transceiver unit may be a transceiver. The apparatus may further include a storage unit, and the storage unit may be a memory. The storage unit is configured to store instructions. The processing unit executes the instructions stored in the storage unit, so that the terminal device performs a corresponding function in any one of the first aspect or the designs of the first aspect, or the processing unit executes the instructions stored in the storage unit, so that the access network device performs a corresponding function in any one of the second aspect or the designs of the second aspect. When the apparatus is a chip or a chip set in the communication device, the processing unit may be a processor, and the transceiver unit may be an input/output interface, a pin, a circuit, or the like. The processing unit executes instructions stored in a storage unit, so that the terminal device performs a corresponding function in any one of the first aspect or the designs of the first aspect, or the processing unit executes instructions stored in a storage unit, so that the access network device performs a corresponding function in any one of the second aspect or the designs of the second aspect. The storage unit may be a storage unit (for example, a register or a cache) in the chip or the chip set, or may be a storage unit (for example, a read-only memory or a random access memory) that is in the terminal device and that is located outside the chip or the chip set.

According to an eleventh aspect, this application provides a computing data transmission apparatus, including a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the method in any one of the first aspect or the designs of the first aspect, or the method in any one of the second aspect or the designs of the second aspect.

According to a twelfth aspect, an embodiment of this application provides a computer storage medium. The computer storage medium stores program instructions. When the program instructions are run on a communication device, the communication device is enabled to perform the method in any one of the first aspect and the possible designs of the first aspect, and the method in any one of the second aspect and the possible designs of the second aspect of embodiments of this application.

According to a thirteenth aspect, an embodiment of this application provides a computer program product. When the computer program product runs on a communication device, the communication device is enabled to perform the method in any one of the first aspect and the possible designs of the first aspect, and the method in any one of the second aspect and the possible designs of the second aspect of embodiments of this application.

According to a fourteenth aspect, an embodiment of this application provides a chip. The chip is coupled to a memory, and performs the method in any one of the first aspect and the possible designs of the first aspect, and the method in any one of the second aspect and the possible designs of the second aspect of embodiments of this application.

It should be noted that "coupling" in this embodiment of this application indicates a direct combination or an indirect combination of two components.

According to a fifteenth aspect, an embodiment of this application provides a communication system. The system includes a terminal device and an access network device. The terminal device may implement the method in any one of the first aspect and the possible designs of the first aspect of embodiments of this application. The access network device may implement the method in any one of the second aspect and the possible designs of the second aspect of embodiments of this application.

DESCRIPTION OF EMBODIMENTS

Compared with 2/3/4G, 5G has made a significant leap in key performance such as a network speed, a network latency, and a connection scale, and can adapt to various scenarios and differentiated service requirements. In addition, a 5G network needs to support more flexible air interface technologies and network architectures. The flexibility of the 5G network inevitably brings network complexity. The increasing network complexity makes a conventional network operation and maintenance mode unsustainable.

With continuous enhancement of hardware computing capabilities such as a central processing unit (CPU)/graphics processing unit (GPU), an artificial intelligence (AI) technology emerges rapidly and is successfully applied to a plurality of fields such as speech recognition, facial recognition, simplified operation and maintenance in a wireless communication field, and algorithm optimization. Currently, many operators are experimenting with and deploying machine learning and other AI technologies on a large scale to explore how to use artificial intelligence tools to implement more efficient radio resource management and more automated network operation and maintenance, reduce operating expense (OPEX), and quickly and agilely respond to new service requirements.

Figure 1:
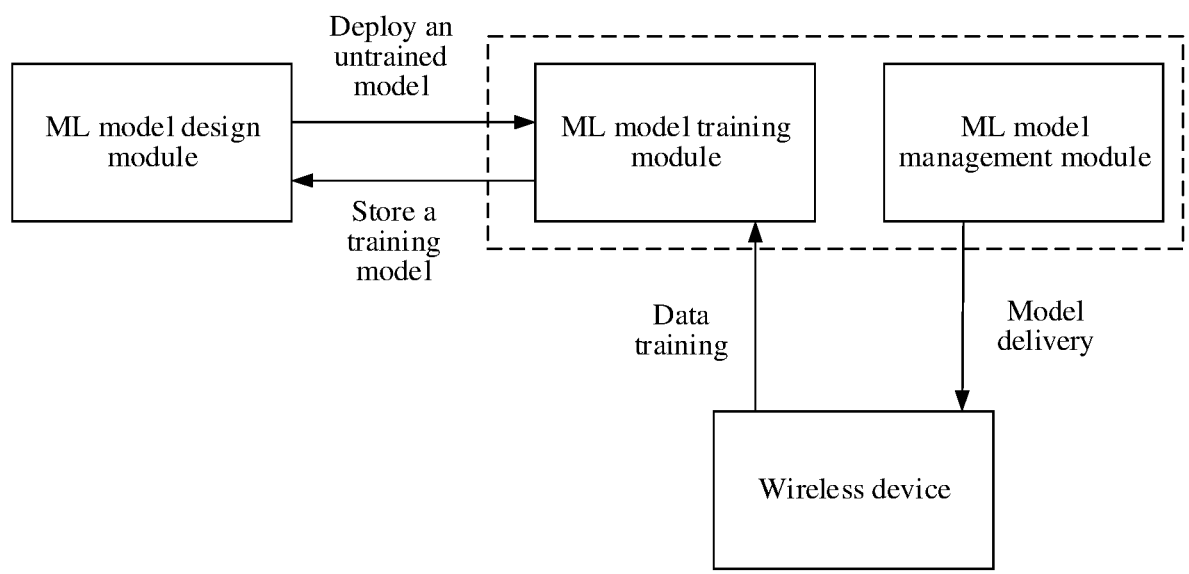
FIG. 1 is a schematic diagram of an ML model-oriented wireless intelligent network architecture according to an embodiment of this application.

Currently, extensive research on the AI technology in a wireless network has driven the industry to systematically reconfigure a network. For example, an AI application market platform is set up and distribution and independent deployment of optimized algorithm models are supported. For example, an ML model-oriented wireless intelligent network architecture may be that shown in FIG. 1. The architecture is a switching framework that supports an ML model package/file that can be dynamically loaded/updated. An ML model-based automatic loading architecture includes an ML model design module, an ML model training module, and an ML model management module. The ML model design module is configured to design an ML model. The ML model training module is configured to train, based on training data from a wireless device, the ML model designed by the ML model design module. The ML model management module is configured to send the ML model trained by the ML model training module to the wireless device. The architecture may support a federated learning mechanism to transfer the ML model instead of transferring data, thereby resolving a problem such as a large amount of AI training data and improving ML model retraining precision. The ML model automatic loading architecture supports loading of the ML model to the wireless device.

Intelligent computing in fields such as a physical layer, media access control, radio resource control, radio resource management, and operation and maintenance needs to be performed between a terminal device and a wireless network. Therefore, computing data exists between the terminal device and an access network device, for example, data related to a computing model used for intelligent computing. The computing model may be an ML model or the like. The computing data may be obtained through processing by the access network device, a core network device, an operation and maintenance server, or the like, and then sent by the access network device to the terminal device. Currently, a manner in which a network side sends data to a terminal side mainly includes SRB transmission or DRB transmission.

Because an SRB supports only transmission of simple small-sized packet control signaling, computing data usually has a large amount of data, and is usually in the order of millions (M) bytes. In addition, the SRB has a highest priority and is used to transmit data or signaling of a highest QoS level. The computing data has different QoS levels based on different tasks. Therefore, the computing data is not suitable to be transmitted through the SRB.

Figure 2:
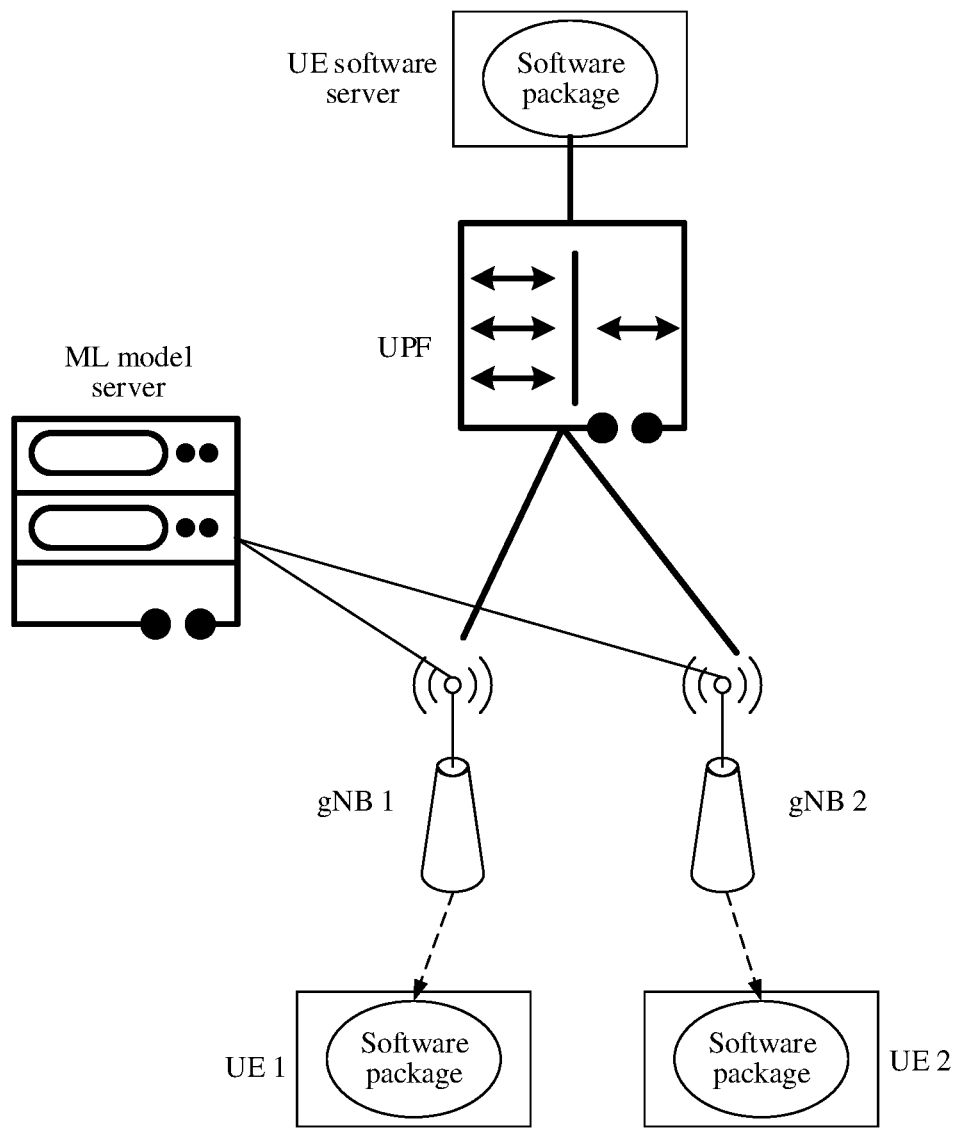
FIG. 2 is a schematic diagram of transmitting a computing model through an application layer according to an embodiment of this application.

If the computing data is considered as application layer data and sent to the terminal device through a DRB, a transmission process is as follows: After the access network device obtains the computing data through processing, a user plane function (UPF) entity packages the computing data into application program data. Then, the UPF entity sends the packaged application program data to the access network device, and the access network device sends the application program data to the terminal device through the DRB, as shown in FIG. 2. Transmission of the computing data through an application layer has the following problems:

1. The access network device, the core network device, the operation and maintenance server, or the like is an internal device of a wireless communication network. If the access network device, the core network device, the operation and maintenance server, or the like serves as a server for generating computing data, an address needs to be visible to a public network terminal device. In this case, an unnecessary internet protocol (IP) network configuration is required, and additional measures for security hardening are required as the wireless network is exposed to a public network, increasing costs.

2. If transmission is performed through the application layer, a transmission path through which the computing data needs to pass is: a server (for example, the access network device, the core network device, or the operation and maintenance server) for generating the computing data→ the core network device→ the access network device→ the terminal device. The transmission path is long, affecting charging of the terminal device.

3. A QoS level and integrity protection required for transmission of the computing data are different from those for user data at the application layer. Therefore, the computing data is transmitted through the application layer at the expense of scalability.

Currently, there is no effective procedure for efficiently sending the computing data from the wireless network side to the terminal.

Based on this, embodiments of this application provide a computing data transmission method and apparatus, to transmit computing data. The method and the apparatus are based on a same inventive concept. The method and the apparatus have similar problem-resolving principles. Therefore, for implementations of the method and the apparatus, refer to each other. Repeated content is not described again.

Embodiments of this application provide the computing data transmission method. The method may be used in a 5G (fifth generation mobile communication system) system, for example, a communication system such as an access network using a new radio access technology (New RAT) and a cloud radio access network (CRAN). The 5G system may be used in a non-roaming scenario, or may be used in a roaming scenario. The 5G system may be used in a service-based architecture, or may be used in an interface-based architecture. This is not limited herein. It should be understood that embodiments of this application may also be applied to future communication (for example, 6G or another network).

Figure 3:
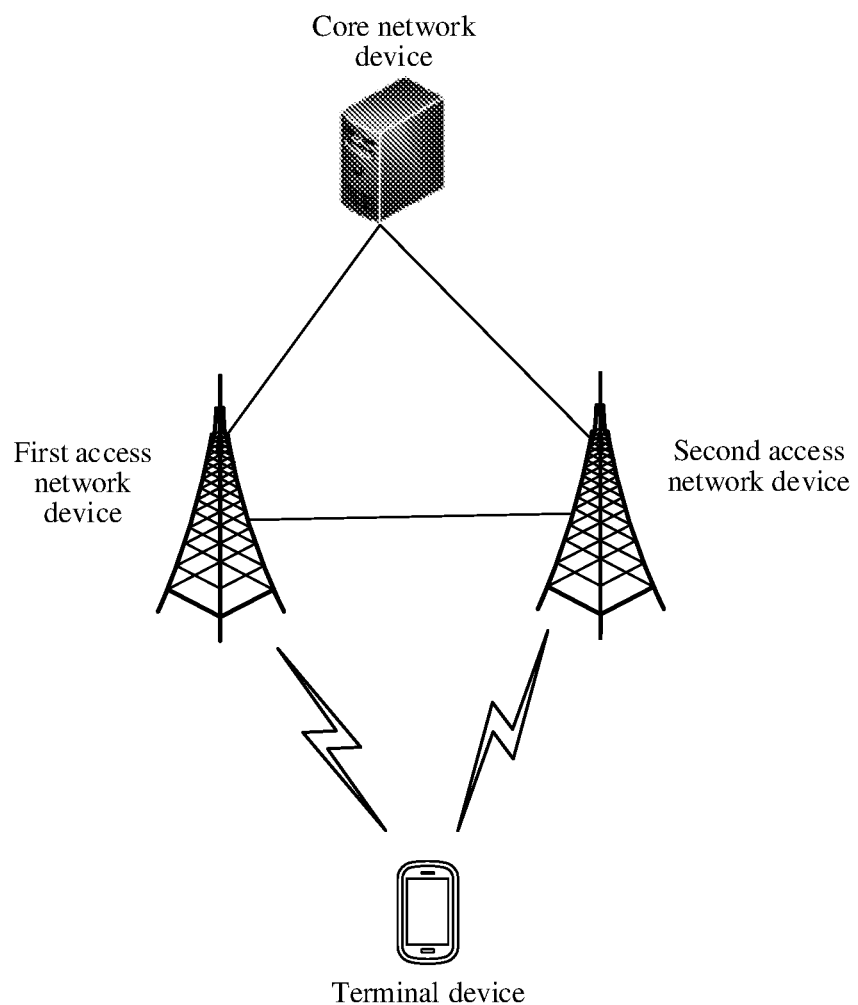
FIG. 3 is a schematic diagram of an architecture of a communication system according to an embodiment of this application.

For example, an architecture of a communication system in embodiments of this application may be that shown in FIG. 3. The communication system may include a core network device, a first access network device, a second access network device, and a terminal device. The first access network device or the second access network device can communicate with the core network device. The terminal device can communicate with the first access network device or the second access network device. The terminal device can also communicate with both the first access network device and the second access network device, that is, multi-radio dual connectivity (MR-DC). In an MR-DC scenario, the first access network device may be a primary access network device, the second access network device may be a secondary access network device, and the first access network device and the second access network device may be access network devices of different communication standards, or may be access network devices of a same communication standard. It should be understood that FIG. 3 is merely an example for description, and does not limit quantities of core network devices, access network devices, and terminal devices and connection relationships in the communication system.

The terminal device in embodiments of this application is an entity that is on a user side and that is configured to receive or transmit a signal. The terminal device may be a device that provides a user with a voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a remote station, an access point, a remote terminal, an access terminal, a user terminal, a user agent, a user device, UE, or the like. The terminal device may be a wireless terminal or a wired terminal. The wireless terminal may refer to a device having a wireless transceiver function, and may be deployed on land, including an indoor or outdoor device, a handheld device, or a vehicle-mounted device; or may be deployed on a water surface (for example, on a steamboat); or may be deployed in the air (for example, on an airplane, a balloon, or a satellite). The terminal device may be a mobile terminal, for example, a mobile phone (also referred to as a "cellular" phone), and a computer that has a mobile terminal. For example, the terminal device may be a portable, pocket-sized, handheld, computer built-in, or in-vehicle mobile apparatus, which exchanges a voice and/or data with the radio access network. For example, the terminal device may alternatively be a device such as a personal communications service (PCS) phone, a cordless phone, a session initiation protocol (SIP) phone, a wireless local loop (WLL) station, a personal digital assistant (PDA), an uncrewed aerial vehicle, an internet of things (IoT) device (for example, a sensor, an electricity meter, or a water meter), a vehicle-to-everything (V2X) device, or a station (ST) in a wireless local area network (WLAN). A common terminal device includes, for example, a mobile phone, a tablet computer, a notebook computer, a palmtop computer, a mobile internet device (MID), a vehicle-mounted device, and a wearable device such as a smartwatch, a smart band, or a pedometer. However, this is not limited in embodiments of this application. The terminal may alternatively be a terminal in a next-generation communication system, for example, a terminal in a 5G communication system, a terminal in a future evolved public land mobile network (PLMN), or a terminal in an NR communication system. This is not limited herein.

The terminal device in embodiments of this application may implement functions such as computing data collection, computing model training, computing model generation, computing model update, and computing model distribution. For ease of description, the functions such as computing data collection, computing model training, computing model generation, computing model update, and computing model distribution are referred to as a data and analysis management (DAM) function below. It should be understood that this is merely an example name, and is not limited.

In an implementation, the terminal device may include a DAM module. The DAM module is configured to implement the DAM function, for example, functions such as data collection, model training, model generation, and action generation. A model training result of the DAM module is used for an access stratum (such as a physical layer (PHY), media access control (MAC), RLC, or RRC) functional module of the terminal device or the access network device, or the model training result of the DAM module is used for a non-access stratum functional module of the terminal device or the core network device.

Figure 4:
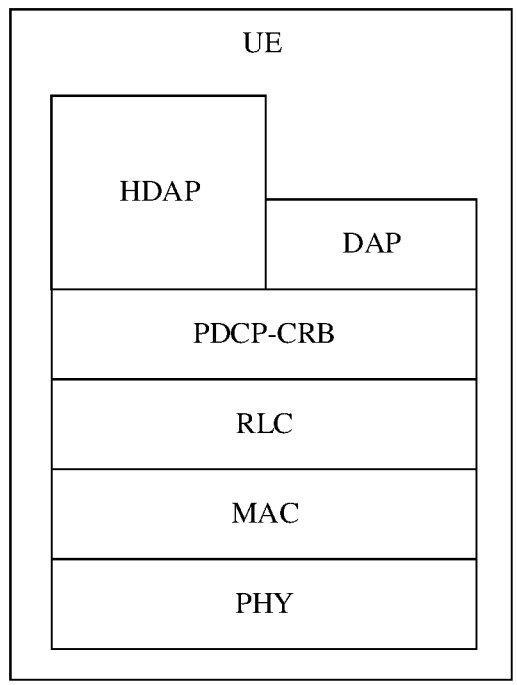
FIG. 4 is a schematic diagram of a protocol stack of a terminal device according to an embodiment of this application.

For example, a protocol stack of the terminal device may be that shown in FIG. 4. FIG. 4 shows only a protocol layer used for computing data transmission in the terminal device.

The terminal device may include a protocol layer used to implement functions such as collection and distribution of computing data between the terminal device and the access network device. For ease of description, the protocol layer is referred to as a data analysis protocol (DAP) layer below. The DAP layer may support the functions such as collection and distribution of the computing data between the terminal device and the access network device. It should be understood that the DAP is merely an example name, and is not limited.

The protocol stack of the terminal device may further include a protocol layer used to implement functions such as collection and distribution of computing data between the terminal device and the core network device. For ease of description, the protocol layer is referred to as a high data analysis protocol (HDAP) layer below. The HDAP layer may support the functions such as collection and distribution of the computing data between the terminal device and the core network device. It should be understood that the HDAP is merely an example name, and is not limited.

The terminal device may further include a PDCP layer. Functions of the PDCP may include data transmission (including computing data and the like), ordered sending, encryption and decryption (including encryption and decryption of the computing data and the like), repetition detection, timer-based discarding, internet protocol (IP) header compression and decompression, and the like. The PDCP may set up a radio bearer used to transmit the computing data. For ease of description, the radio bearer used to transmit the computing data is referred to as a computing radio bearer (CRB) below. It should be understood that the computing radio bearer is merely an example name herein, and a name of the radio bearer is not limited. A packet size, a QoS level, and the like of CRB transmission is applicable to the computing data.

For example, the CRB may use a logical channel identifier (LCID) different from that of an SRB/DRB. For example, the CRB may use a reserved LCID value in a downlink shared channel (DL-SCH)/uplink shared channel (UL-SCH) in a 3GPP standard. In an example, the CRB may use 35 to 46 of Table 6.2.1-1 Values of LCID for DL-SCH in the 3GPP TS 38.321 specification v15.7.0 protocol as the LCID of the CRB carrying computing data transmitted from the access network device to the terminal device. In another example, the CRB may use 35 to 44 of Table 6.2.1-2 Values of LCID for UL-SCH in the 3GPP TS 38.321 specification v15.7.0 protocol as the LCID of the CRB carrying computing data transmitted from the terminal device to the access network device.

A QoS characteristic of the CRB may also be different from that of the SRB/DRB. For example, a QoS level of the CRB may be lower than that of the SRB/DRB. For another example, the SRB does not have a packet delay budget (PDB), and the CRB may have a PDB.

Information transmitted by the CRB is different from that transmitted by the SRB/DRB. For example, the information carried in the SRB is signaling, the DRB carries user application layer data from UE and a data network, and the CRB carries computing data in a wireless network, for example, a computing model in the wireless network. For another example, an amount of data of information carried in the SRB is small, and the CRB may not have a limitation on the amount of data. For still another example, charging of the terminal device is related when the SRB transmits information, but charging of the terminal device may not be related when the CRB transmits information.

In addition, if data transmitted by the CRB is RAN computing data, data transmission of the CRB may be terminated by the access network device, that is, the RAN computing data transmitted by the CRB may not be returned to the core network device. Compared with transmission of the computing data through the DRB, a transmission path is short when the CRB transmits the computing data, so that a transmission delay can be reduced. In addition, charging of the terminal device is not affected when the CRB transmits the RAN computing data. If data transmitted by the CRB is CN computing data, data transmission of the CRB may be terminated by a 3GPP core network device, that is, the CN computing data transmitted by the CRB may not be transmitted to a data network other than a 3GPP network.

For example, the PDCP layer may include a sublayer used to implement functions such as data transmission of the computing data and encryption and decryption of the computing data. For ease of description, the sublayer, at the PDCP layer, supporting the functions such as data transmission of the computing data and encryption and decryption of the computing data may be referred to as a "PDCP-CRB" sublayer. It should be understood that the PDCP-CRB is merely an example name, and is not limited.

The core network device in embodiments of this application may be an access and mobility management function (AMF), and is mainly responsible for functions such as access control, mobility management, attachment and detachment, and gateway selection. The core network device may alternatively be a network analytics function (NWDAF), and is mainly responsible for functions such as data collection and analysis. The core network device in this application is not limited to the AMF and the NWDAF.

The core network device in embodiments of this application may also implement the DAM function.

In an implementation, the core network device may include a DAM module. The DAM module is configured to implement the DAM function, for example, functions such as data collection, model training, model generation, and action generation. A model training result of the DAM module is used for a non-access stratum functional module of the terminal device or the core network device.

Figure 5:
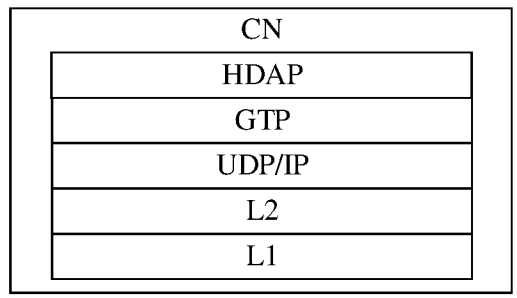
FIG. 5 is a schematic diagram of a protocol stack of a core network device according to an embodiment of this application.

For example, a user plane protocol stack of the core network device may be that shown in FIG. 5. FIG. 5 shows only a protocol layer used for computing data transmission in the core network device.

The protocol stack of the core network device may include an HDAP layer used to implement functions such as collection and distribution of the computing data between the terminal device and the core network device. The HDAP layer may support the functions such as collection and distribution of the computing data between the terminal device and the core network device.

The user plane protocol stack of the core network device may further include a general packet radio service (GPRS) tunneling protocol (GTP) layer, a user datagram protocol (UDP)/IP layer, and the like. In an example for description, the HDAP layer may be a user plane protocol stack of the core network device. For example, the HDAP layer may be an upper-layer protocol layer of the GTP layer.

The access network device in embodiments of this application is an entity configured to transmit or receive a signal on a network side, is configured to connect a terminal to a wireless network, and may provide functions such as radio resource management, quality of service management, and data encryption and compression for the terminal device. The access network device may be referred to as a base station, or may be referred to as an access network (RAN) node. For example, the access network device may be a next-generation NodeB (gNB), a transmission reception point (TRP), an evolved NodeB (eNB), a radio network controller (RNC), a NodeB (NB), a base station controller (base station controller, BSC), a base transceiver station (BTS), a home base station (for example, a home evolved NodeB or a home NodeB, HNB), a baseband unit (BBU), or a wireless fidelity (Wi-Fi) access point (AP).

Figure 6:
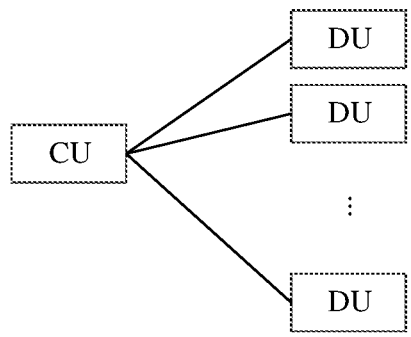
FIG. 6 is a schematic diagram of a structure of an access network device according to an embodiment of this application.

For example, a structure of the access network device in embodiments of this application may be that shown in FIG. 6. Specifically, the access network device may be divided into a CU and at least one DU. An interface between the CU and the DU may be an F1 interface. The CU may be configured to manage or control the at least one DU, which may also be referred to as that the CU is connected to the at least one DU. In this structure, protocol layers of the access network device in a communication system may be separated. A part of the protocol layers are controlled by the CU in a centralized manner, and functions of a part or all of remaining protocol layers are distributed in the DU. The CU controls the DU in a centralized manner. For example, the access network device is a gNB. Protocol layers of the gNB include an RRC layer, a service data adaptation protocol (SDAP) layer, a PDCP layer, an RLC layer, a media access control (MAC) layer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not limited in embodiments of this application.

Figure 7:
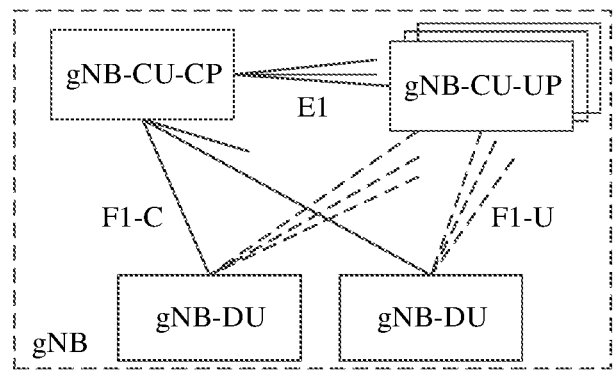
FIG. 7 is a schematic diagram of a structure of another access network device according to an embodiment of this application.

For example, the CU in embodiments of this application may be further divided into one CU-CP and a plurality of CU-UPs. The CU-CP may be used for control plane management, and the CU-UP may be used for user plane data transmission. An interface between the CU-CP and the CU-UP may be an E1 interface. An interface between the CU-CP and the DU may be F1-C, and is used for control plane signaling transmission. An interface between the CU-UP and the DU may be F1-U, and is used for user plane data transmission. The CU-UPs may be connected through an Xn-U interface, to perform user plane data transmission. For example, a gNB is used as an example. A structure of the gNB may be that shown in FIG. 7.

The access network device in embodiments of this application may also implement the foregoing DAM function. In an implementation, the access network device may include a DAM module, or the access network device is connected to a device including a DAM module. The DAM module is configured to implement a DAM function, for example, functions such as data collection, model training, model generation, and action generation. A model training result of the DAM module is used for an access stratum (such as PHY, MAC, RLC, and RRC) functional module of the terminal device or the access network device.

Figure 8:
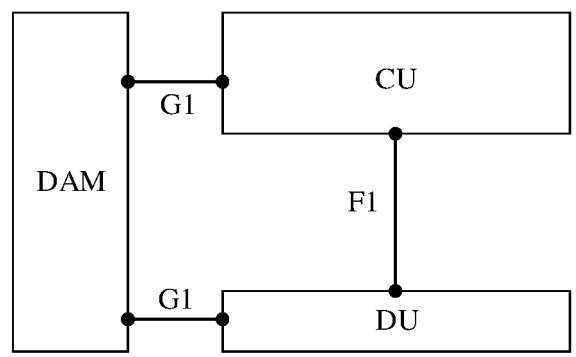
FIG. 8 is a schematic connection diagram of a DAM module of an access network device according to an embodiment of this application.
Figure 9:
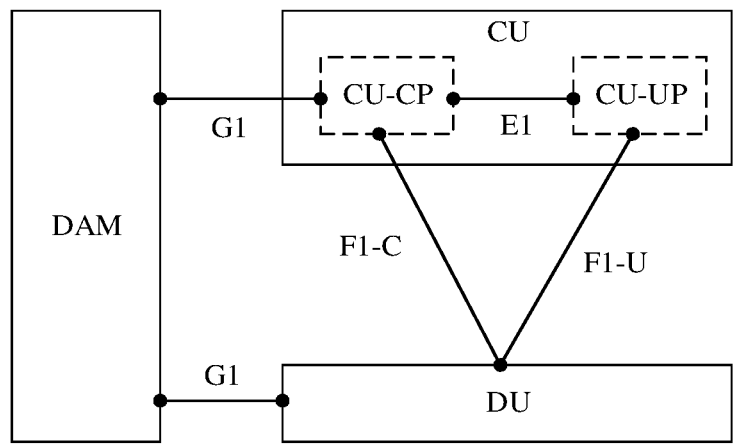
FIG. 9 is a schematic connection diagram of a DAM module of another access network device according to an embodiment of this application.

For example, if the access network device may include a DAM module, the DAM module may be connected to the CU by using a G1 interface, and may be connected to the DU through a G1 interface, for example, as shown in FIG. 8. Further, if the CU is divided into a CU-CP and a CU-UP, the DAM module may be connected to the CU-CP of the CU through a G1 interface, for example, as shown in FIG. 9. In another implementation, the DAM may alternatively be separately used as an internal function of the CU, the CU-CP, or the DU. For example, the CU, the CU-CP, or the DU includes a DAM module configured to implement the DAM. In this implementation, a G1 interface may be an internal interface of the access network device, and is invisible to the outside.

The access network device may include a DAP protocol layer used to implement functions such as collection and distribution of computing data between the terminal device and the access network device. The DAP layer may support the functions such as collection and distribution of the computing data between the terminal device and the access network device.

The access network device includes the foregoing PDCP-CRB sublayer.

Figure 10:
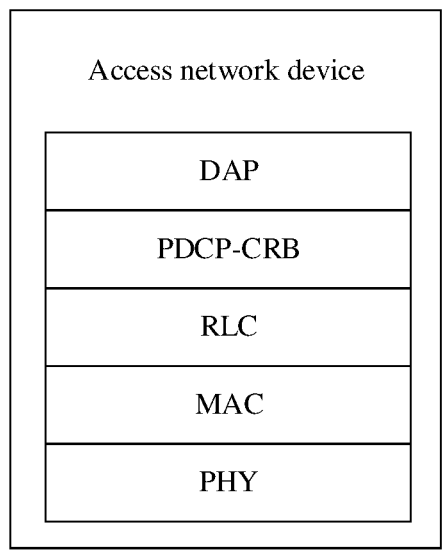
FIG. 10 is a schematic diagram of a protocol stack of an access network device according to an embodiment of this application.

For example, a protocol stack for communicating with the terminal device in the access network device may be that shown in FIG. 10. FIG. 10 shows only a protocol layer that is in the access network device and that is used for computing data transmission between the access network device and the terminal device.

Figure 11:
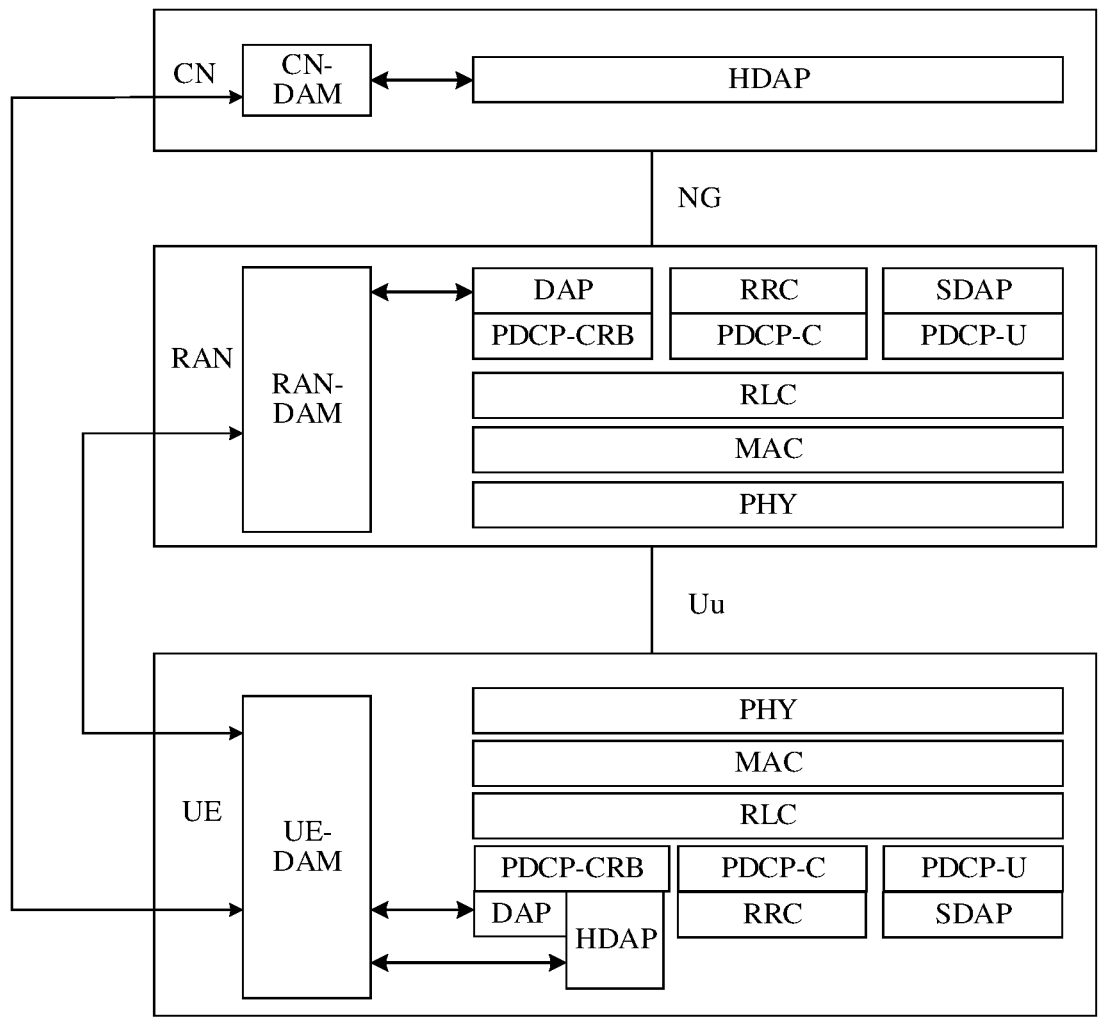
FIG. 11 is a schematic diagram of a wireless network architecture according to an embodiment of this application.

With reference to the terminal device, the access network device, and the core network device, a wireless network architecture may be that shown in FIG. 11. The wireless network architecture may further include another protocol layer (not shown in FIG. 11) for communication between the access network device and the core network device. UE-DAM is a DAM module of the terminal device, and may implement functions such as computing data (for example, computing data between the terminal device and the access network device or computing data between the terminal device and the core network device) collection, model training, model generation, and action generation. RAN-DAM is a DAM module of the access network device, or a DAM module connected to the access network device, and may implement functions such as computing data collection, model training, model generation, and action generation between the terminal device and the access network device. CN-DAM is a DAM module of the core network device, and may implement functions such as computing data collection, model training, model generation, and action generation between the terminal device and the core network device.

For ease of description, for example, in the following, the computing data exchanged between the terminal device and the access network device is referred to as RAN computing data, and the computing data exchanged between the terminal device and the core network device is referred to as CN computing data.

The terminal device may include protocol layers such as PHY, MAC, RLC, PDCP, DAP, HDAP, RRC and SDAP. The PDCP layer may include a PDCP-CRB, a PDCP-C, and a PDCP-U. The PDCP-CRB supports functions such as transmission, ordered sending, encryption, and decryption of computing data. The PDCP-CRB may set up a CRB between the terminal device and the access network device. The terminal device may send RAN computing data or CN computing data to the access network device through the CRB, and may also receive, through the CRB, RAN computing data or CN computing data sent by the access network device. The CN computing data may be sent by the core network device to the access network device. The PDCP-C supports functions such as transmission, ordered sending, encryption, and decryption of control plane data. The PDCP-U supports functions such as transmission, ordered sending, encryption, and decryption of user plane data. The DAP layer may support functions such as collection and distribution of the RAN computing data. The HDAP layer may support functions such as collection and distribution of the CN computing data. The RRC layer supports functions such as setup of a radio bearer and configuration of a lower layer controlled by RRC signaling between the base station and the terminal device. The SDAP layer supports functions such as mapping between a QoS flow and a DRB.

The access network device may include protocol layers such as PHY, MAC, RLC, PDCP, DAP, RRC and SDAP. The PDCP layer may include a PDCP-CRB sublayer, a PDCP-C sublayer, and a PDCP-U sublayer. The PDCP-CRB sublayer supports functions such as transmission, ordered sending, encryption, and decryption of computing data. The PDCP-CRB sublayer may set up, modify, and release a CRB between the terminal device and the access network device. The access network device may send RAN computing data to the terminal device through the CRB, or send CN computing data from the core network device to the terminal device through the CRB, or receive, through the CRB, RAN computing data or CN computing data sent by the terminal device. The access network device may send the received CN computing data to the core network device. The PDCP-C sublayer supports functions such as transmission, ordered sending, encryption, and decryption of control plane data. The PDCP-U sublayer supports functions such as transmission, ordered sending, encryption, and decryption of user plane data. The DAP layer may support functions such as collection and distribution of the RAN computing data between the terminal device and the access network device. The RRC layer supports functions such as setup of a radio bearer and configuration of a lower layer controlled by RRC signaling between the base station and the terminal device. The SDAP layer supports functions such as mapping between a QoS flow and a DRB.

The core network device may include a protocol layer such as HDAP, and the HDAP layer may support functions such as collection and distribution of the CN computing data.

Figure 12:
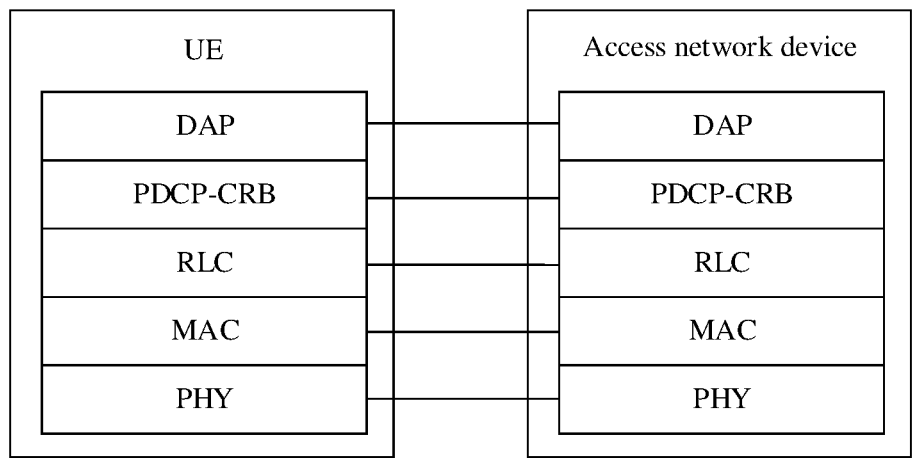
FIG. 12 is a schematic diagram of protocol stacks of a terminal device and an access network device according to an embodiment of this application.

In an example for description, a protocol stack used to transmit computing data between the terminal device and the access network device may be that shown in FIG. 12. A PHY layer of the terminal device corresponds to a PHY layer of the access network device, a MAC layer of the terminal device corresponds to a MAC layer of the access network device, an RLC layer of the terminal device corresponds to an RLC layer of the access network device, a PDCP-CRB layer of the terminal device corresponds to a PDCP-CRB layer of the access network device, and a DAP layer of the terminal device corresponds to a DAP layer of the access network device.

Figure 13:
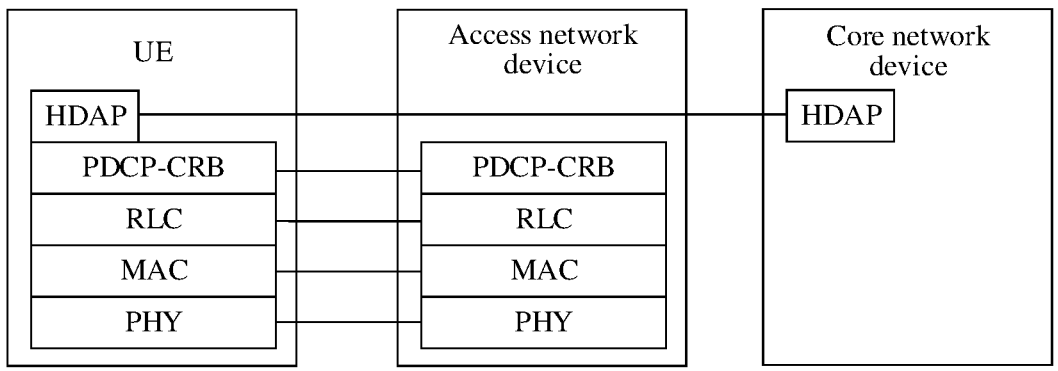
FIG. 13 is a schematic diagram of protocol stacks of a terminal device and a core network device according to an embodiment of this application.

In another example for description, a protocol stack used to transmit computing data between the terminal device and the core network device may be that shown in FIG. 13. FIG. 13 shows only protocol layers used for computing data in the terminal device and the core network device. A PHY layer of the terminal device corresponds to a PHY layer of the core network device, a MAC layer of the terminal device corresponds to a MAC layer of the core network device, an RLC layer of the terminal device corresponds to an RLC layer of the core network device, a PDCP-CRB layer of the terminal device corresponds to a PDCP-CRB layer of the core network device, and an HDAP layer of the terminal device corresponds to an HDAP layer of the core network device.

An uplink is used as an example. A DAP entity of the terminal device transmits RAN computing data to a PDCP-CRB entity of the terminal device, and then the PDCP-CRB entity of the terminal device sends the RAN computing data to the access network device through a CRB. A PDCP-CRB entity of the access network device transmits the RAN computing data to a DAP entity of the access network device for processing. Alternatively, an HDAP entity of the terminal device transmits CN computing data to a PDCP-CRB entity of the terminal device, the PDCP-CRB entity of the terminal device sends the CN computing data to the access network device through a CRB, the access network device sends the CN computing data to the core network device through an NG interface, and an HDAP entity of the core network device processes the CN computing data.

A downlink is used as an example. A DAP entity of the access network device transmits RAN computing data to a PDCP-CRB entity of the access network device, and then the PDCP-CRB entity of the access network device sends the RAN computing data to the terminal device through a CRB. A PDCP-CRB entity of the terminal device transmits the RAN computing data to a DAP entity of the terminal device for processing. Alternatively, the core network device sends CN computing data of an HDAP entity to the access network device through an NG interface, for example, may send the CN computing data to the access network device in a container manner. The PDCP-CRB entity of the access network device sends the CN computing data to the PDCP-CRB entity of the terminal device through the CRB. The PDCP-CRB entity of the terminal device transmits the CN computing data to an HDAP entity of the terminal device for processing.

In embodiments of this application, the CRB corresponds to the DRB, and is a bearer used to transmit the computing data. CRB management (such as setup, modification, release, activation, and deactivation) is performed through the SRB. For example, CRB configuration information is sent to the terminal device by using an RRC message, the terminal device is indicated by using an RRC message, to delete/activate/deactivate the CRB, or the CRB is reconfigured by using an RRC message.

It should be understood that, in embodiments of this application, "at least one" means one or more, and "a plurality of" means two or more. "At least one of the following pieces (items)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

In addition, it should be understood that in descriptions of this application, terms such as "first" and "second" are merely used for differentiation and description, but should not be understood as an indication or implication of relative importance or an indication or implication of a sequence.

The following describes, with reference to the accompanying drawings, a computing data transmission method provided in embodiments of this application.

Figure 14:
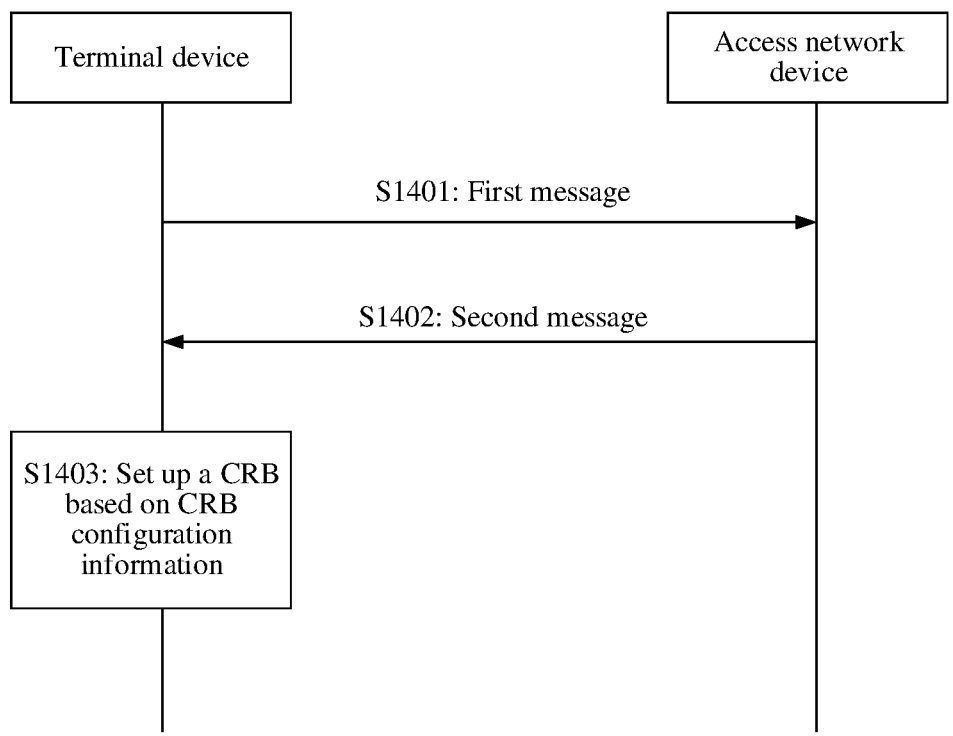
FIG. 14 is a schematic flowchart of a computing data transmission method according to an embodiment of this application.

FIG. 14 is a flowchart of a computing data transmission method according to this application. The method includes the following operations.

S1401: A terminal device sends a first message to an access network device, where the first message is used to request the access network device to set up a first radio bearer, and the first radio bearer is used to carry computing data. Correspondingly, the access network device receives the first message sent by the terminal device.

With the development of services such as artificial intelligence and VR/AR, new computing requirements, for example, AI computing (including computing required by AI model training and inference) and real-time rendering computing of VR services with device-edge-cloud synergy, are derived from wireless communication networks. Centering on these new computing requirements, service flows such as computing task splitting, computing resource management and scheduling collaboration, and AI model distribution are related. In this process, data such as a computing-related negotiation interaction message, computing task splitting data, data for describing a computing model (such as an AI model), and data generated by the computing model is generated.

The computing data may be data derived from the wireless communication network with the development of the services such as artificial intelligence and virtual reality (VR)/mobile application augmented reality (AR), for example, the computing-related negotiation interaction message, the computing task splitting data, the data for describing the computing model (such as the AI model), and the data generated by the computing model.

For example, a channel for transmitting the computing data may be referred to as an intelligent computing plane, a computing level, a computing layer, a computing plane, or the like. It should be understood that the computing data may also be referred to as intelligent computing data, computing plane data, computing level data, or the like.

For ease of description, the first radio bearer used to carry the computing data is referred to as a CRB below.

S1402: The access network device sends a second message to the terminal device, where the second message carries CRB configuration information. Correspondingly, the terminal device receives the second message sent by the access network device.

In an example for description, the CRB configuration information may include a PDCP-CRB sublayer configuration (for example, an ordering delivery timer) of the CRB, an RLC mode (acknowledged, unacknowledged, and transparent) of the CRB, an uplink and downlink RLC layer configuration (for example, a sequence number field length and a retransmission timer) of the CRB, and a logical channel identifier and a priority configuration of the CRB.

S1403: The terminal device sets up the CRB between the terminal device and the access network device based on the CRB configuration information.

The CRB is used to transmit access network computing data or core network computing data between the terminal device and the access network device.

In this embodiment of this application, the terminal device and the access network device support setup of the radio bearer used to transmit the computing data, so that the terminal device and the access network device can implement transmission of the computing data such as a computing model through the radio bearer. The computing data is transmitted through the CRB, so that transmission of the computing data may not be limited by SRB transmission or DRB transmission.

After the CRB is set up between the terminal device and the access network device, the terminal device and the access network device may transmit the computing data through the CRB that is set up. The computing data may be transmitted from the access network device to the terminal device, or may be transmitted from the terminal device to the access network device.

For transmission of first computing data transmitted from the access network device to the terminal device, the access network device may send the first computing data to the terminal device through the CRB that is set up. The first computing data may be access network computing data, or may be core network computing data.

Figure 15A:
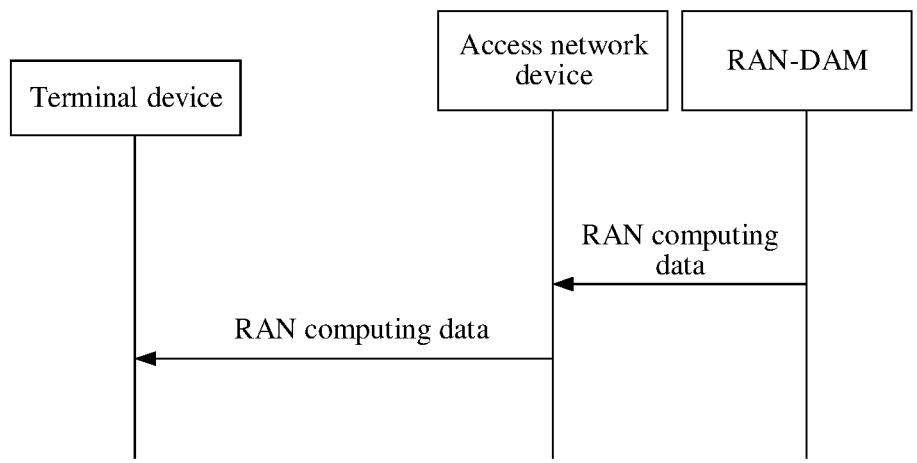
FIG. 15*a* is a schematic diagram in which an access network device transmits RAN computing data to a terminal device according to an embodiment of this application.

If the first computing data is RAN computing data, the first computing data may be data output by a DAP entity of the access network device. After receiving the first computing data, the terminal device may transmit the first computing data to a DAP entity of the terminal device for processing, for example, as shown in FIG. 15a.

In an implementation, if a RAN-DAM module and the access network device are independently deployed, the access network device may receive RAN computing data sent by the RAN-DAM, and send the RAN computing data to the terminal device through the CRB.

Figure 15B:
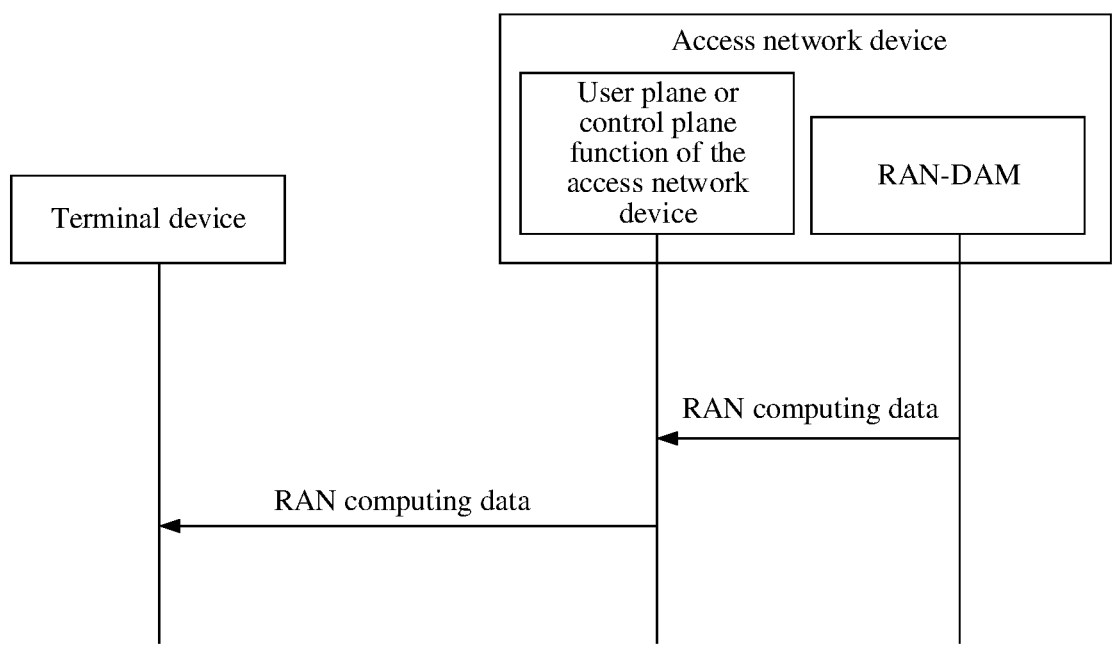
FIG. 15*b* is another schematic diagram in which an access network device transmits RAN computing data to a terminal device according to an embodiment of this application.

In another implementation, if a RAN-DAM module and the access network device are deployed in an integrated manner, the RAN-DAM of the access network device may send RAN computing data to a control plane or user plane function of the access network device through an internal interface of the access network device, and the control plane or user plane function of the access network device sends the RAN computing data to the terminal device through the CRB, for example, as shown in FIG. 15b.

If the first computing data is CN computing data, the first computing data may be data output by an HDAP entity of a core network device. The core network device may send the first computing data to the access network device through an NG interface, and then the access network device sends the first computing data to the terminal device through the CRB that is set up. After receiving the first computing data, the terminal device transmits the first computing data to an HDAP entity of the terminal device for processing.

In a possible implementation, the access network device may segment the first computing data based on a maximum amount of transmitted data of the CRB, to obtain a plurality of data subsegments. The access network device may sequentially send the plurality of data subsegments to the terminal device through the CRB.

A size of the data subsegment may not be greater than a preset threshold, or a size of the data subsegment may be less than a preset threshold, where the preset threshold may be the maximum amount of transmitted data of the CRB. For example, assuming that the preset threshold is 9000 bytes, the size of the data subsegment may not be greater than 9000 bytes.

In an example for description, the access network device may send the plurality of data subsegments to the terminal device in the following manner.

A1: The access network device sequentially sends a plurality of messages to the terminal device, where each message carries a sequence number, an acknowledgment request, and data of one data subsegment. The sequence number is used to identify the data subsegment. The acknowledgment request indicates the terminal device whether to send an acknowledgment message after receiving the data. For example, if the acknowledgment request is false, the terminal device may be indicated not to send an acknowledgment message after receiving the data. If the acknowledgment request is true, the terminal device may be indicated to send an acknowledgment message after receiving the data.

A2: After the terminal device correctly receives a message, if an acknowledgment request carried in the message is false, the terminal device does not send an acknowledgment message. If an acknowledgment request carried in the message is true, the terminal device sends an acknowledgment message.

The acknowledgment message may be sent for the message received currently, or the acknowledgment message may be an acknowledgment for a current message and one or more messages before the current message. For example, the acknowledgment message may carry a list, and the list may include sequence numbers of successfully received data subsegments in the current message and the one or more messages before the current message.

A3: The access network device retransmits, based on the received acknowledgment message, data of one or more data subsegments that are not successfully received by the terminal device.

Figure 16:
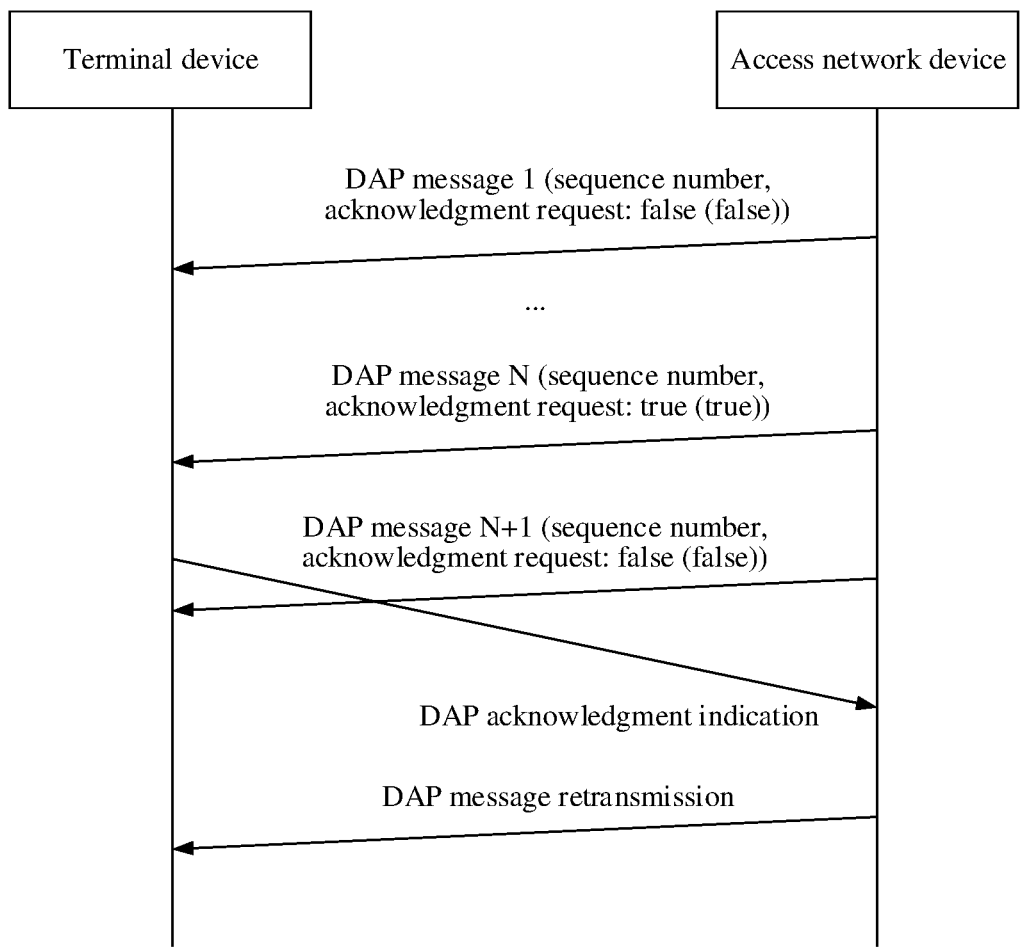
FIG. 16 is a schematic diagram of a computing data sending method according to an embodiment of this application.

For example, as shown in FIG. 16, the access network device sequentially sends a DAP message 1 to a DAP message N+1 to the terminal device, where the DAP message 1 carries a sequence number of a data subsegment 1, an acknowledgment request (false), and data of the data subsegment 1, the DAP message N carries a sequence number of a data subsegment N, an acknowledgment request (true), and data of the data subsegment N, and the DAP message N+1 carries a sequence number of a data subsegment N+1, an acknowledgment request (false), and data of the data subsegment N+1. After receiving the DAP message N, the terminal device sends a DAP acknowledgment indication to the access network device, where the DAP acknowledgment indication may carry a sequence number of a data subsegment successfully received by the terminal device. The access network device retransmits, based on the DAP acknowledgment indication, a data subsegment that is not successfully received by the terminal device in the data subsegments 1 to N.

It may be understood that the DAP message may indicate the acknowledgment request by using a field. For example, when the field is true, the terminal device may be indicated to send the acknowledgment message after receiving the data. When the field is false, the terminal device may be indicated not to send the acknowledgment message after receiving the data. Alternatively, the DAP message may indicate the acknowledgment request by using one bit. For example, when a value of the bit is 1, the terminal device may be indicated to send the acknowledgment message after receiving the data. When a value of the bit is 0, the terminal device may be indicated not to send the acknowledgment message after receiving the data.

In another example for description, the access network device may alternatively send the plurality of data subsegments to the terminal device in the following manner.

B1: The access network device sequentially sends a plurality of messages to the terminal device, where each message carries a subsequent packet indication and data of one data subsegment, and the subsequent packet indication indicates whether a next data subsegment is to be received. For example, if the subsequent packet indication is Yes, the terminal device may be indicated to receive data of the next data subsegment, or it may indicate that data transmission does not end. If the subsequent packet indication is No, it may indicate that there is no data of the next data subsegment, or may indicate that data transmission ends.

B2: After the terminal device receives a message, if a subsequent packet indication carried in the message is Yes, the terminal device continues to receive a next message. If a subsequent packet indication carried in the message is No, the terminal device may determine that data transmission ends.

Figure 17:
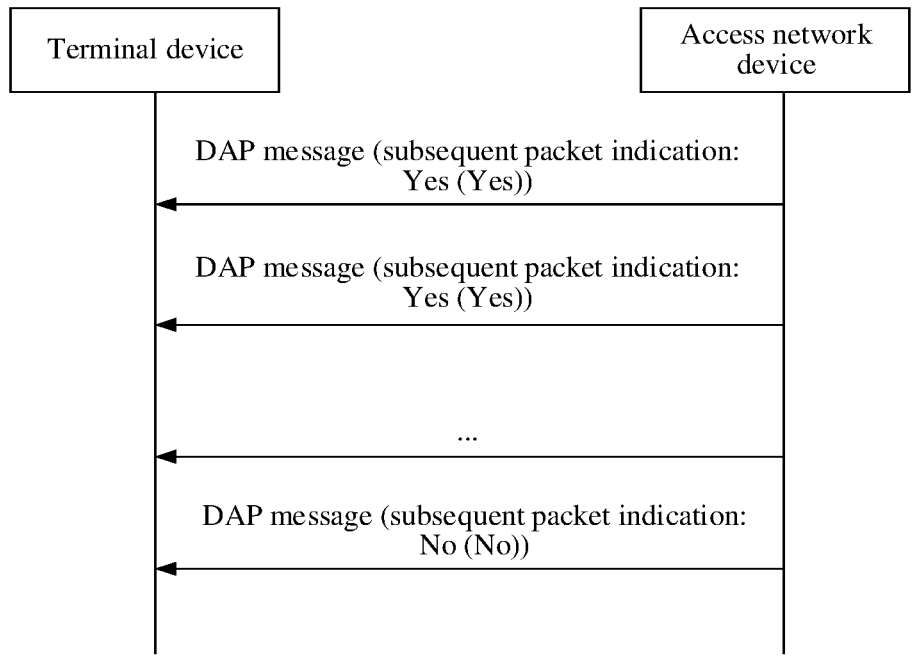
FIG. 17 is a schematic diagram of another computing data sending method according to an embodiment of this application.

For example, as shown in FIG. 17, the first computing data includes N data subsegments, and the access network device sequentially sends a DAP message 1 to a DAP message N to the terminal device, where the DAP message 1 to the DAP message N−1 each carry data of one data subsegment and a subsequent packet indication, and the subsequent packet indications carried in the DAP message 1 to the DAP message N−1 are Yes. The DAP message N carries data subsegment N and a subsequent packet indication, and the subsequent packet indication carried in the DAP message N is No. The terminal device receives the DAP message sent by the access network device until the DAP message N whose subsequent packet indication is No is received.

It may be understood that the DAP message may indicate, by using a field, whether there is a subsequent packet. For example, when the field is Yes, it may indicate that there is a subsequent packet. When the field is No, it may indicate that there is no subsequent packet. Alternatively, the DAP message may indicate, by using one bit, whether there is a subsequent packet. For example, when a value of the bit is 1, it may indicate that there is a subsequent packet. When a value of the bit is 0, it may indicate that there is no subsequent packet.

Because a size of a sent data packet that is supported by the CRB may be limited, large computing data may be segmented and sent in the foregoing two manners, and a probability of a packet loss may be reduced.

For transmission of second computing data transmitted from the terminal device to the access network device, the terminal device may send the second computing data to the access network device through the CRB that is set up. The second computing data may be RAN computing data, or may be CN computing data.

If the second computing data is RAN computing data, the second computing data may be data output by the DAP entity of the terminal device. After receiving the second computing data, the access network device may transmit the second computing data to a DAP layer of the access network device for processing. In this scenario, data transmission of the CRB may be terminated by the access network device, that is, the RAN computing data transmitted by the CRB may not be returned to the core network device.

If the second computing data is CN computing data, the second computing data may be data output by the HDAP entity of the terminal device. After receiving the second computing data, the access network device may send the second computing data to the core network device, and the HDAP entity of the core network device performs processing. In this scenario, data transmission of the CRB may be terminated by the 3GPP core network device, that is, the CN computing data transmitted by the CRB may not be transmitted to a public network.

Figure 18A:
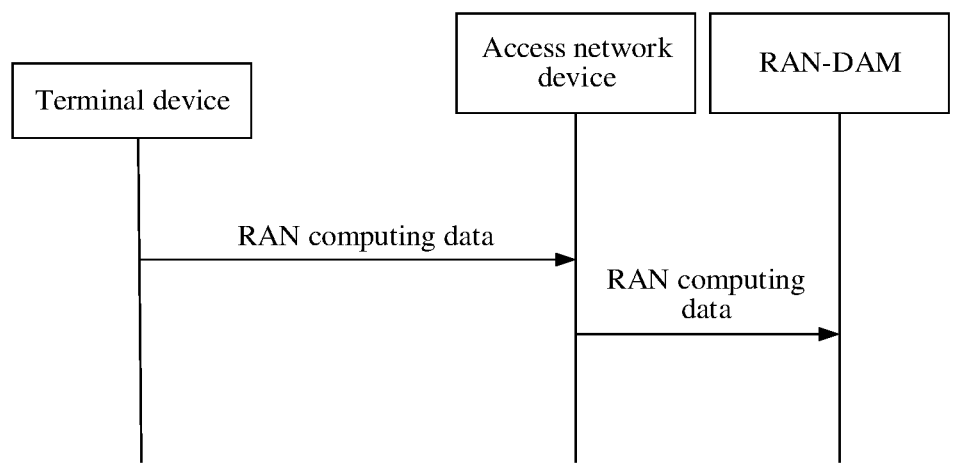
FIG. 18*a* is a schematic diagram in which a terminal device sends computing data to an access network device according to an embodiment of this application.

In an implementation, if the RAN-DAM module and the access network device are independently deployed, after receiving the RAN computing data sent by the terminal device, the access network device may further send the RAN computing data to the RAN-DAM. After receiving the RAN computing data, the RAN-DAM may process the RAN computing data. For example, the computing data is an AI model. The RAN-DAM may merge computing models after receiving the computing data, as shown in FIG. 18*a*.

Figure 18B:
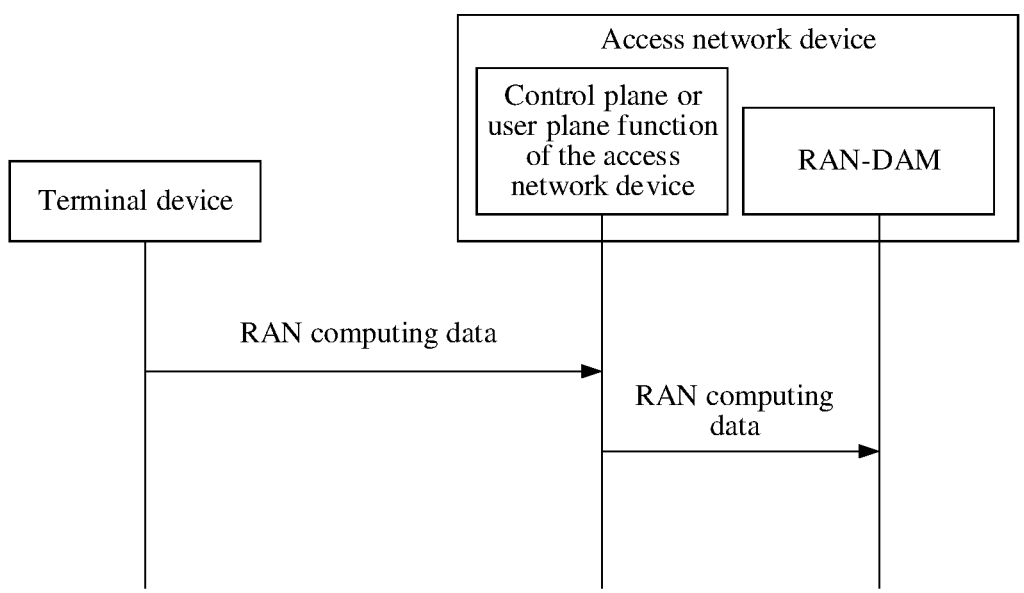
FIG. 18*b* is another schematic diagram in which a terminal device sends computing data to an access network device according to an embodiment of this application.

In another implementation, if the RAN-DAM module and the access network device are deployed in the integrated manner, when the terminal device sends the RAN computing data to the access network device, the control plane or user plane function of the access network device may receive the RAN computing data, and send the RAN computing data to the RAN-DAM entity through the internal interface of the access network device, as shown in FIG. 18*b*. After receiving the RAN computing data, the RAN-DAM entity may process the RAN computing data. For example, using an example in which the RAN computing data is an AI model, the RAN-DAM entity may merge computing models after receiving the RAN computing data.

For example, a method used by the terminal device to send the second computing data to the access network device is similar to a method used by the access network device to send the first computing data to the terminal device. For details, refer to related descriptions of sending the first computing data by the access network device to the terminal device. Details are not described herein again.

It should be noted that, in an implementation, before the CRB is set up between the terminal device and the access network device, a network side further needs to obtain whether the terminal device supports the CRB. For example, before operation S1402, the terminal device may report capability information to the access network device, where the capability information indicates that the terminal device supports the CRB. The capability information may be actively reported by the terminal device. Alternatively, the capability information may be reported by the terminal device under triggering of a seventh message sent by the access network device, and the seventh message is used to enquire whether the terminal device supports the CRB.

Figure 19:
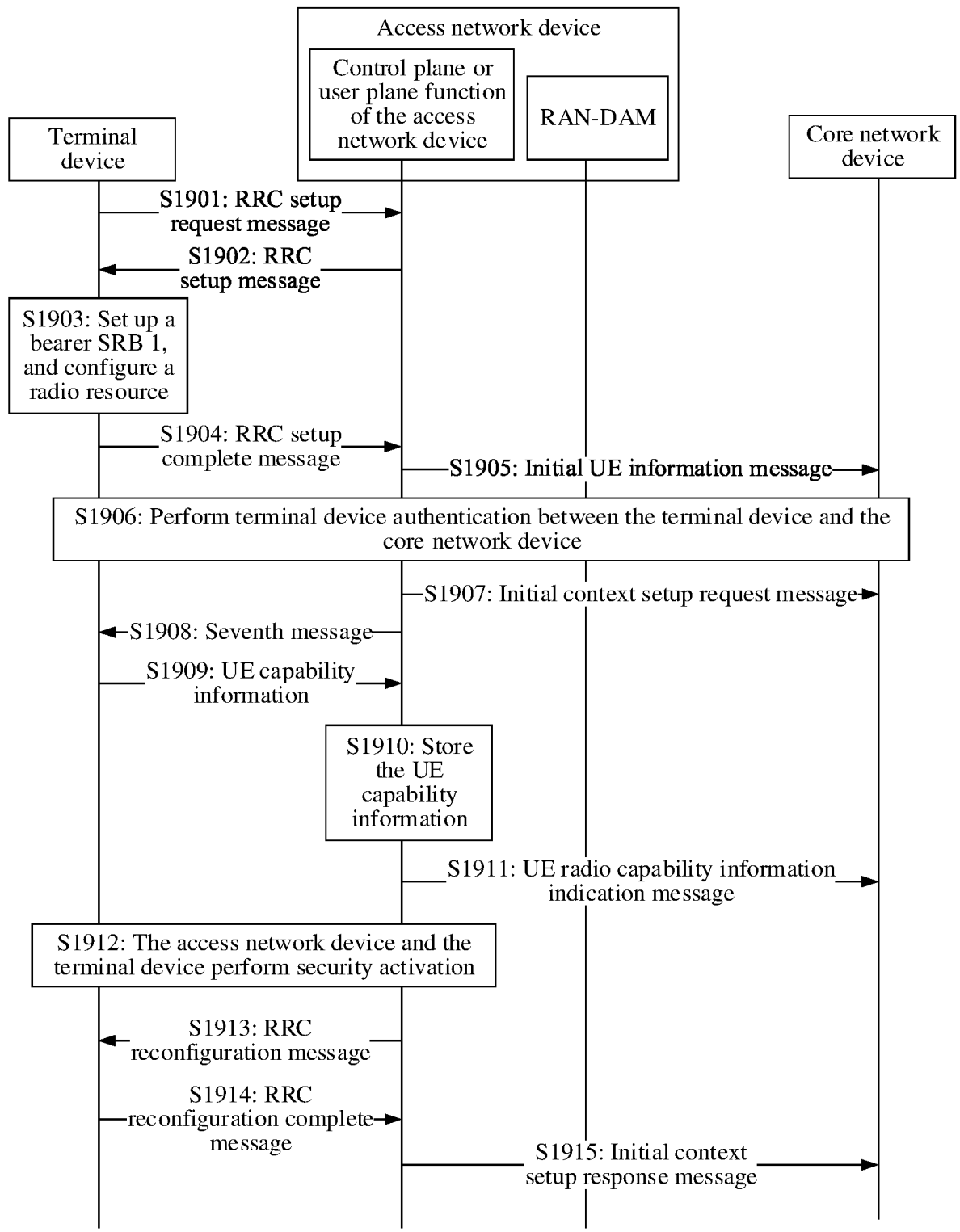
FIG. 19 is a schematic diagram of a process in which a terminal device reports capability information according to an embodiment of this application.

To better understand the foregoing method used by the terminal device to report the capability information, the following uses an example to describe, with reference to a specific scenario, a process in which the terminal device reports the capability information. As shown in FIG. 19, the process in which the terminal device reports the capability information includes the following operations.

S1901: The terminal device sends an RRC setup request (RRCSetupRequest) message to an access network device.

S1902: The access network device sends an RRC setup (RRCSetup) message to the terminal device.

Optionally, the RRCSetup message may include information for setting up a bearer SRB 1 and radio resource configuration information.

S1903: The terminal device sets up the bearer SRB 1, and configures a radio resource.

S1904: The terminal device sends an RRC setup complete (RRCSetupComplete) message to the access network device.

Optionally, the RRCSetupComplete message may include a NAS stratum registration request (Registration request) message.

The NAS stratum registration request message may be encapsulated in a container of the RRCSetupComplete message.

S1905: The access network device sends an initial UE information (Initial UE Message) message to a core network device.

Optionally, the initial UE message may include the NAS stratum registration request message.

The NAS stratum registration request message may be encapsulated in a container of the initial UE message.

S1906: Perform terminal device authentication between the terminal device and the core network device.

S1907: The core network device sends an initial context setup request message to the access network device.

It should be understood that the foregoing operations S1901 to S1907 are optional operations. In a specific embodiment, before operation S1908, operations S1901 to S1907 may be performed, or operations S1901 to S1907 may not be performed.

Optionally, the initial context setup request message may include a NAS stratum registration accept message. The initial context setup request message may further carry security information supported by the terminal device.

The NAS stratum registration accept message may be encapsulated in a container of an initial context setup response message.

If the access network device does not include UE capability information of the terminal device, operation S1908 is performed.

S1908: The access network device sends a seventh message to the terminal device, where the seventh message is used to enquire whether the terminal device supports a CRB.

For example, the seventh message may be a UE capability enquiry message, and the UE capability enquiry message may be used to enquire a UE capability.

S1909: The terminal device sends, to the access network device, the capability information indicating that the terminal device supports the CRB.

For example, the terminal device may send the UE capability information to the access network device, where the UE capability information may include information indicating that "UE supports the CRB".

In an example for description, the UE capability information may indicate, by using one bit, whether the terminal device supports the CRB. For example, if a value of the bit is 1, it indicates that the terminal device supports the CRB. If a value of the bit is 0, it indicates that the terminal device does not support the CRB. For another example, if the UE capability information includes the bit, it indicates that the terminal device supports the CRB. If the UE capability information does not include the bit, it indicates that the terminal device does not support the CRB.

In another example for description, the UE capability information may alternatively indicate, by using a field of a plurality of bits, whether the terminal device supports the CRB. For example, the UE capability information includes "CRB supported", indicating that the terminal device supports the CRB. The UE capability information includes "CRB unsupported", indicating that the terminal device does not support the CRB.

It should be noted that when the terminal device actively reports the capability information of the CRB of the terminal device, operation S1908 may be omitted.

S1910: The access network device stores the capability information indicating that the terminal device supports the CRB.

S1911: The access network device sends, to the core network device, the capability information indicating that the terminal device supports the CRB.

For example, the access network device may send a UE radio capability information indication message to the core network device, where the UE radio capability info indication message indicates to update the UE capability information, and the UE radio capability info indication message carries information indicating that "the UE supports the CRB".

In an example for description, the UE radio capability info indication message may indicate, by using one bit, whether the terminal device supports the CRB. For example, if a value of the bit is 1, it indicates that the terminal device supports the CRB. If a value of the bit is 0, it indicates that the terminal device does not support the CRB. For another example, if the UE radio capability info indication message includes the bit, it indicates that the terminal device supports the CRB. If the UE radio capability info indication message does not include the bit, it indicates that the terminal device does not support the CRB.

S1912: The access network device and the terminal device perform security activation.

In an implementation, the access network device sends a security mode command (SecurityModeCommand) message to the terminal device based on security information that is supported by the UE and carried in the initial context setup request message. After completing security activation, the terminal device sends a security mode complete (SecurityModeComplete) message to the access network device.

S1913: The access network device sends an RRC reconfiguration (RRCReconfiguration) message to the terminal device.

Optionally, the RRCReconfiguration message may indicate the terminal device to set up an SRB 2.

The RRCReconfiguration message may further include the NAS stratum registration accept message.

The NAS stratum registration accept message may be encapsulated in a container of the RRCReconfiguration message.

S1914: The terminal device sends an RRC reconfiguration complete message to the access network device.

S1915: The access network device sends an initial context setup response message to the core network device, where the initial context setup response message indicates that context setup of the UE is completed.

Then, the terminal device may send an uplink NAS stratum transparent transmission (ULNasTRANs) message to the core network device through the access network device. The ULNasTRANs message includes a NAS stratum registration complete message. For example, the NAS stratum registration complete message may be encapsulated in a container of the ULNasTRANs message.

It should be understood that the foregoing operations S1912 to S1915 are optional operations. In a specific embodiment, after operation S1911, operations S1912 to S1915 may be performed, or operations S1912 to S1915 may not be performed.

In the foregoing manner, the terminal device that supports the CRB may report the UE capability information to the access network device and the core network device in a registration process. The UE capability information indicates that the terminal device supports the CRB. The access network device and the core network device store the UE capability information of the terminal device, and therefore may set up, activate, and deactivate the CRB as required in a subsequent service procedure based on a capability indicating whether the terminal device supports the CRB.

Figure 20:
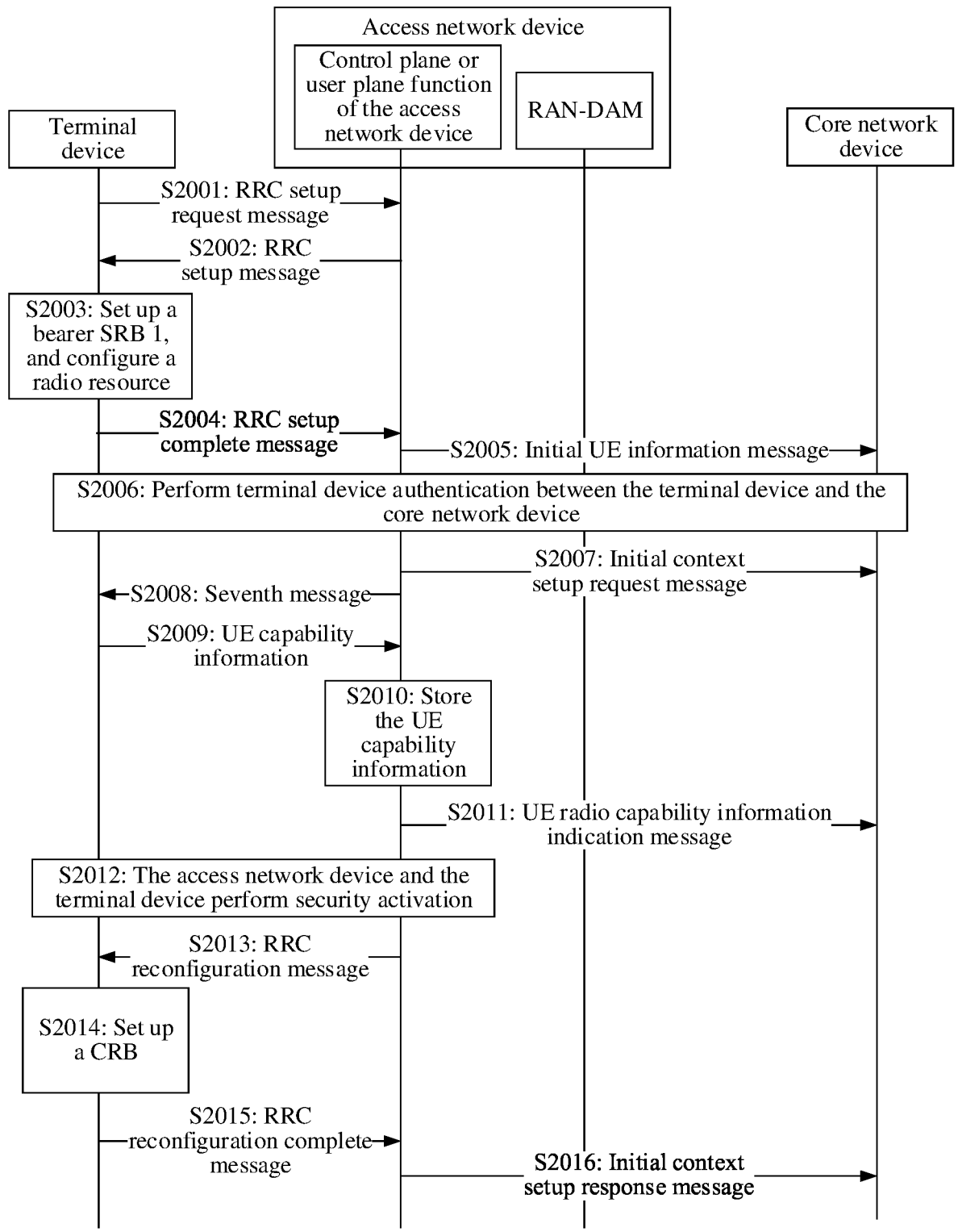
FIG. 20 is a schematic diagram of a process in which a terminal device sets up a CRB according to an embodiment of this application.

It should be noted that the method for setting up the CRB shown in FIG. 14 is used in a case in which the terminal device is in an RRC connected state. In another implementation, if the terminal device is in an RRC idle state, when the terminal device has to-be-sent computing data, the terminal device may set up the CRB in another manner. The following uses an example to describe a process of setting up a CRB with reference to a specific scenario. When the terminal device is in the RRC idle state and has the to-be-sent computing data, a method used by the terminal device to set up the CRB is that shown in FIG. 20. The method includes the following operations.

S2001: For details, refer to S1901. Details are not described herein again.

S2002: An access network device sends an RRCSetup message to the terminal device, where the RRCSetup message carries CRB configuration information.

S2003: For details, refer to S1903. Details are not described herein again.

S2004: The terminal device sends an RRCSetupComplete message to the access network device. The RRCSetupComplete message is equivalent to the first message in operation S1401.

For details of S2005 to S2012, refer to S1905 to S1912. Details are not described herein again.

S2013: The access network device sends an RRCReconfiguration message to the terminal device, where the RRCReconfiguration message indicates the terminal device to set up the CRB, and the RRCReconfiguration message carries the CRB configuration information. The RRCReconfiguration message is equivalent to the second message in operation S1402.

In an example for description, the CRB configuration information may include a PDCP configuration (for example, an ordering delivery timer) of the CRB, an RLC mode (acknowledged, unacknowledged, and transparent) of the CRB, an uplink and downlink RLC layer configuration (for example, a sequence number field length and a retransmission timer) of the CRB, and a logical channel identifier and a priority configuration of the CRB.

In an implementation, if a RAN-DAM module and the access network device are independently deployed, after operation S2013, the access network device may further send indication information to the RAN-DAM, where the indication information may indicate that setup of the CRB is completed.

In another implementation, if a RAN-DAM module and the access network device are deployed in an integrated manner, in operation S2013, a control plane or user plane function of the access network device may receive the RRCReconfiguration message, and send indication information to the RAN-DAM through an internal interface of the access network device, where the indication information may indicate that setup of the CRB is completed.

S2014: The terminal device sets up the CRB.

For details of S2015 and S2016, refer to operations S1914 and S1915. Details are not described herein again.

The terminal device may send computing data, such as RAN computing data and CN computing data, to the access network device through the CRB.

In an implementation, if the computing data is RAN computing data, in a scenario in which the RAN-DAM module and the access network device are independently deployed, after receiving the computing data sent by the terminal device, the access network device may further send the computing data to the RAN-DAM.

In another implementation, if the computing data is RAN computing data, in a scenario in which the RAN-DAM module and the access network device are deployed in the integrated manner, the control plane or user plane function of the access network device may receive the computing data sent by the terminal device, and send the computing data to the RAN-DAM through the internal interface of the access network device.

In an implementation, if the computing data is CN computing data, after receiving the computing data sent by the terminal device, the access network device may send the computing data to a core network device.

In the foregoing manner, support for the CRB may be added on a basis of an RRC reconfiguration procedure, so that the terminal device can set up the CRB when entering an RRC connected state from the RRC idle state, and further transmit the computing data through the CRB.

Generally, after the terminal device and the access network device complete computing data transmission through the CRB, the CRB may be released; or when the terminal device enters the RRC idle state, all CRBs should be released. In a possible example, after setting up the CRB, the terminal device may release the CRB based on an indication of the access network device. For example, the terminal device receives a third message sent by the access network device, where the third message is used to release the CRB; and the terminal device releases the CRB. In another possible example, the terminal device may release the CRB in a process of entering the RRC idle state from the RRC connected state. For example, the access network device sends an RRC release message to the terminal device, and the terminal device releases the CRB after receiving the RRC release message. The RRC release message is the third message.

Figure 21A:
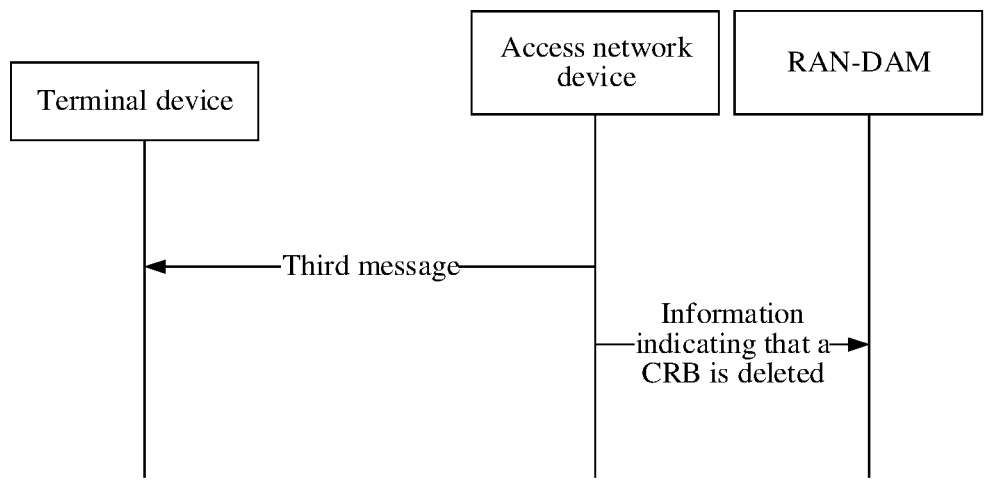
FIG. 21*a* is a schematic diagram of a process in which a terminal device releases a CRB according to an embodiment of this application.

In an implementation, if the RAN-DAM module and the access network device are independently deployed, after sending the third message to the terminal device, the access network device may send, to the RAN-DAM, a message indicating that the CRB has been deleted, for example, as shown in FIG. 21a.

Figure 21B:
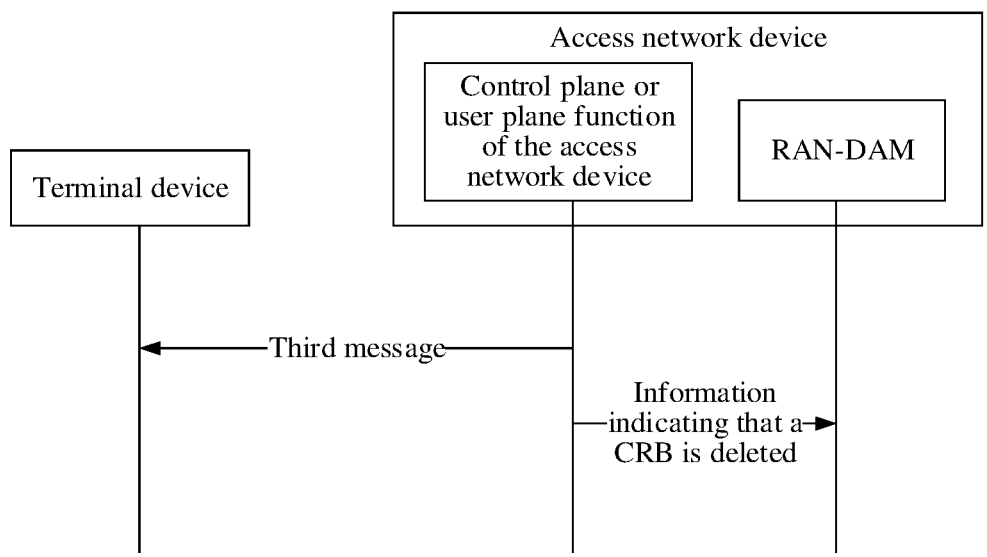
FIG. 21*b* is a schematic diagram of another process in which a terminal device releases a CRB according to an embodiment of this application.

In another implementation, if the RAN-DAM module and the access network device are deployed in the integrated manner, the third message may be sent by the control plane or user plane function of the access network device. After sending the third message to the terminal device, the control plane or user plane function of the access network device may further send, to the RAN-DAM of the access network device through the internal interface of the access network device, information indicating that the CRB is deleted, for example, as shown in FIG. 21b.

When releasing the CRB, the terminal device notifies the RAN-DAM that the CRB is released, so that the RAN-DAM can record a status of the CRB, to avoid a scenario in which the RAN-DAM sends computing data to a RAN because the RAN-DAM does not know that the CRB has been released, causing a data transmission failure.

In addition to releasing the CRB, in some cases, the terminal device and the access network device may deactivate the CRB that is set up. In a possible example, after setting up the CRB, the terminal device may further deactivate the CRB based on an indication of the access network device. For example, the terminal device receives a fourth message sent by the access network device, where the fourth message is used to deactivate the CRB; and the terminal device deactivates the CRB. In another possible example, the terminal device may deactivate the CRB in a process of entering an RRC inactive state from the connected state. For example, the access network device sends, to the terminal device, an RRCRelease message that carries a suspend configuration (suspendConfig) information element, and the suspendConfig information element indicates the terminal device to suspend (or deactivate) an RRC connection. The terminal device deactivates the CRB after receiving the RRCRelease message, where the RRCRelease message that carries the suspendConfig information element is the fourth message.

In an implementation, if the RAN-DAM module and the access network device are independently deployed, after sending, to the terminal device, the RRCRelease message that carries the suspendConfig information element, the access network device may send, to the RAN-DAM, a message indicating that the CRB has been suspended.

Figure 22:
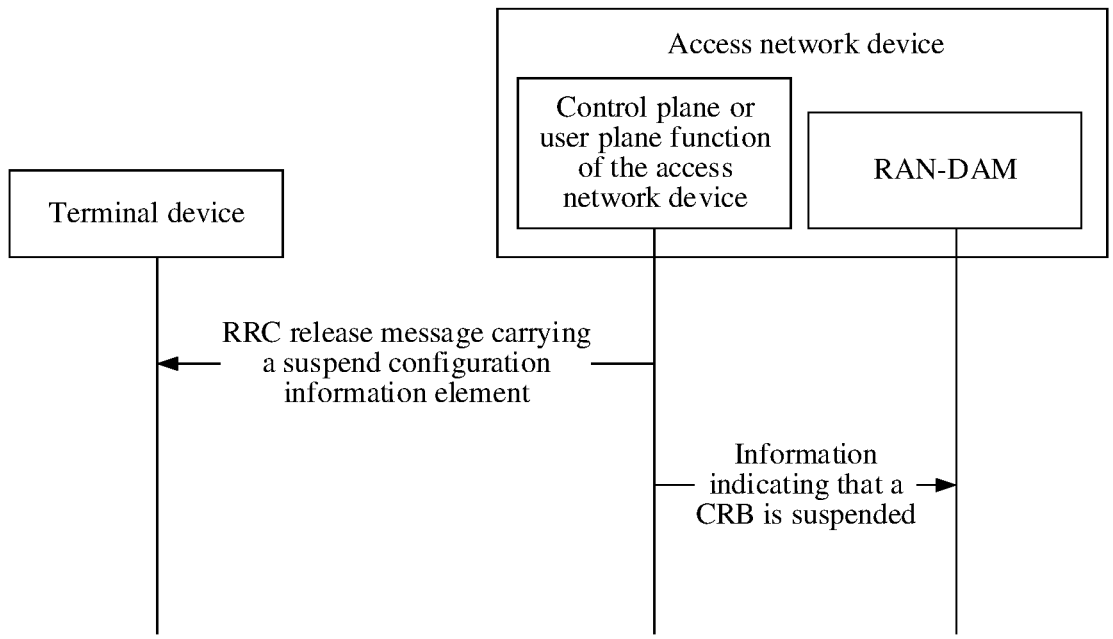
FIG. 22 is a schematic diagram of a process in which a terminal device deactivates a CRB according to an embodiment of this application.

In another implementation, if the RAN-DAM module and the access network device are deployed in the integrated manner, the RRCRelease message that carries the suspendConfig information element may be sent by the control plane or user plane function of the access network device. After sending the RRCRelease message that carries the suspendConfig information element, the control plane or user plane function of the access network device may further send, to the RAN-DAM of the access network device through the internal interface of the access network device, information indicating that the CRB has been suspended, for example, as shown in FIG. 22.

That "the CRB is suspended" may also be understood as that "the CRB is in an inactive state".

When deactivating the CRB, the terminal device notifies the RAN-DAM that the CRB is suspended, so that the RAN-DAM may stop sending the computing data, to avoid a scenario in which the RAN-DAM sends the computing data to the RAN but the CRB of the terminal device is deactivated.

Optionally, after the terminal device deactivates the CRB, if the terminal device needs to send computing data, the terminal device may further request the access network device to activate the CRB. For example, the terminal device sends a fifth message to the access network device, where the fifth message is used to request the access network device to activate the CRB; the terminal device receives a sixth message sent by the access network device, where the sixth message indicates the terminal device to activate the CRB; and the terminal device activates the CRB.

Figure 23:
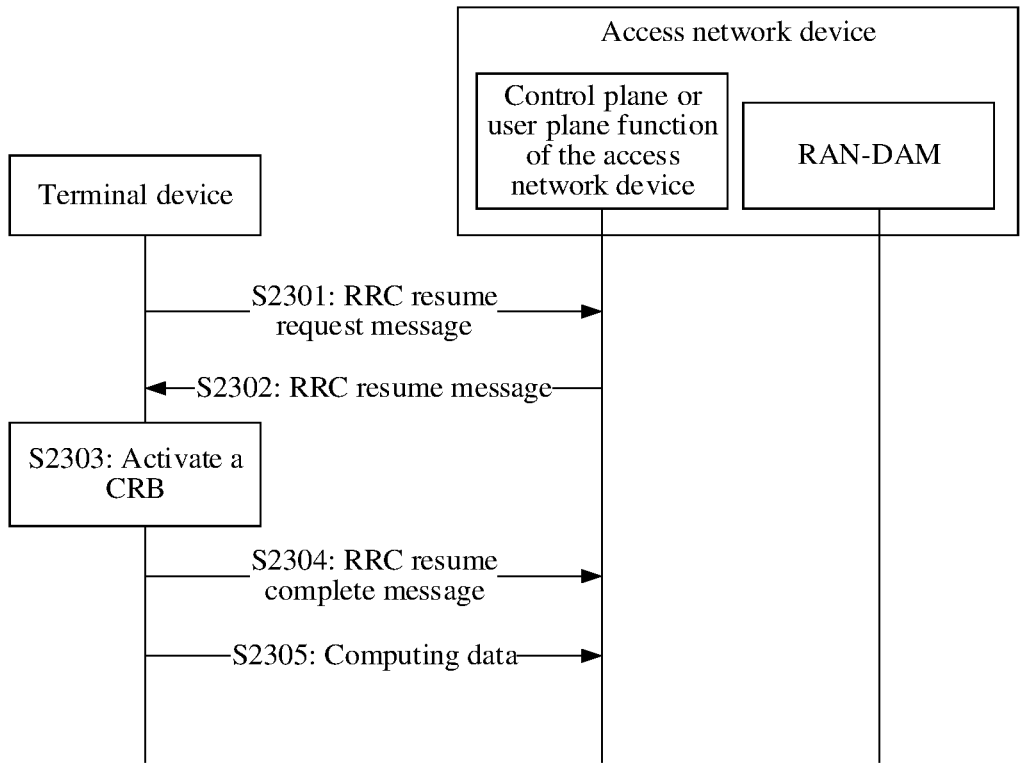
FIG. 23 is a schematic diagram of a process in which a terminal device activates a CRB according to an embodiment of this application.

In a possible example, if the terminal device needs to send computing data after deactivating the CRB, the terminal device may enter the connected state from the inactive state, so that the CRB can be activated in a process of entering the RRC connected state from the RRC inactive state. For example, as shown in FIG. 23, a process in which a terminal device activates a CRB may include the following operations.

S2301: The terminal device may send an RRC resume request (RRCResumeRequest) message to an access network device, where the RRCResumeRequest message is a fifth message.

S2302: The access network device sends an RRC resume (RRCResume) message to the terminal device, where the RRCResume message is a sixth message.

S2303: The terminal device activates the CRB.

S2304: The terminal device sends an RRC resume complete (RRCResumeComplete) message to the access network device.

S2305: The terminal device sends computing data to the access network device through the CRB.

In an implementation, if the computing data is RAN computing data, in a scenario in which a RAN-DAM module and the access network device are independently deployed, after receiving the computing data sent by the terminal device, the access network device may further send the computing data to the RAN-DAM. After receiving the computing data, the RAN-DAM may process the computing data. For example, using an example in which the computing data is an AI model, the RAN-DAM may merge computing models after receiving the computing data.

In another implementation, if the computing data is RAN computing data, in a scenario in which a RAN-DAM module and the access network device are deployed in an integrated manner, when the terminal device sends the computing data to the access network device, a control plane or user plane function of the access network device may receive the computing data, and send the computing data to the RAN-DAM through an internal interface of the access network device. After receiving the computing data, the RAN-DAM may process the computing data. For example, using an example in which the computing data is an AI model, the RAN-DAM may merge computing models after receiving the computing data.

In still another implementation, if the computing data is CN computing data, after receiving the computing data sent by the terminal device, the access network device may further send the computing data to a core network device.

In the foregoing manner, when the terminal device in an RRC inactive state needs to send the computing data, the CRB between the terminal device and the access network device is resumed by using an RRC resume procedure, so that the computing data (for example, an AI/ML model) can be sent to the RAN-DAM through the CRB.

Alternatively, after deactivating the CRB, the terminal device may further release the CRB based on an indication of the access network device. For example, the terminal device receives a third message sent by the access network device, where the third message indicates the terminal device to release the CRB; and the terminal device releases the CRB.

In a possible example, the terminal device may release the CRB in a process of entering an RRC idle state from the RRC inactive state. For example, the access network device sends an RRC release message to the terminal device, and the terminal device deactivates the CRB after receiving the RRC release message. The RRC release message is the third message.

In an implementation, if the RAN-DAM module and the access network device are independently deployed, after sending the third message to the terminal device, the access network device may send, to the RAN-DAM, a message indicating that the CRB has been deleted.

Figure 24:
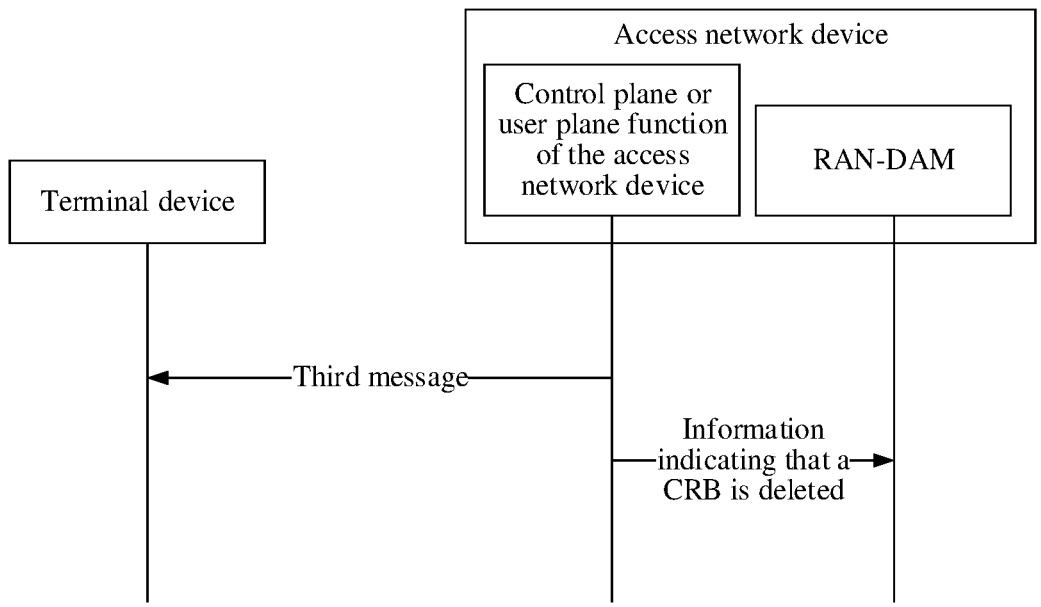
FIG. 24 is a schematic diagram of a process in which a terminal device releases a CRB according to an embodiment of this application.

In another implementation, if the RAN-DAM module and the access network device are deployed in the integrated manner, the third message may be sent by the control plane or user plane function of the access network device. After sending the third message to the terminal device, the control plane or user plane function of the access network device may further send, to the RAN-DAM of the access network device through the internal interface of the access network device, information indicating that the CRB has been deleted, for example, as shown in FIG. 24.

When releasing the CRB, the terminal device notifies the RAN-DAM that the CRB is released, so that the RAN-DAM can record a status of the CRB, to avoid a scenario in which the RAN-DAM sends computing data to a RAN because the RAN-DAM does not know that the CRB has been released, causing a data transmission failure.

Figure 25:
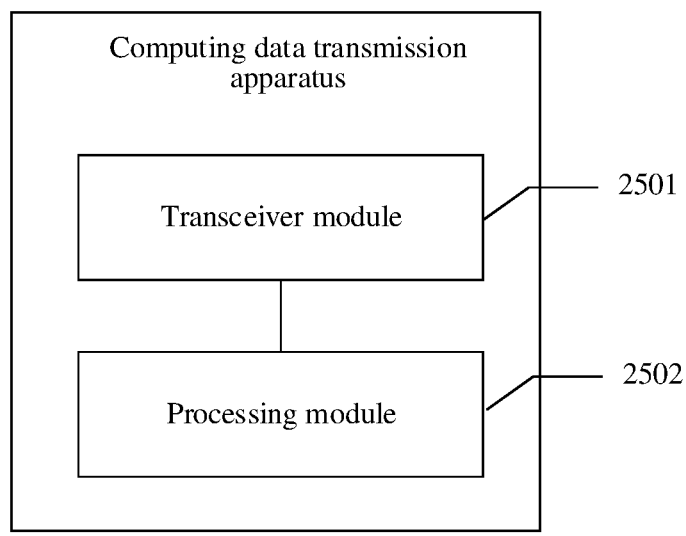
FIG. 25 is a schematic diagram of a structure of a computing data transmission apparatus according to an embodiment of this application.

Based on a same inventive concept as the method embodiments, an embodiment of this application provides a computing data transmission apparatus. A structure of the computing data transmission apparatus may be that shown in FIG. 25, and includes a transceiver module 2501 and a processing module 2502.

In a specific implementation, the computing data transmission apparatus may be configured to implement the methods performed by the terminal device in the embodiments in FIG. 14 to FIG. 24. The apparatus may be the terminal device, or may be a chip, a chip set, or a part, configured to perform a related method function, of a chip in the terminal device. The transceiver module 2501 is configured to: send a first message to an access network device, where the first message is used to request the access network device to set up a first radio bearer, and the first radio bearer is used to carry computing data; and receive a second message sent by the access network device, where the second message carries radio bearer configuration information. The processing module 2502 is configured to set up the first radio bearer based on the radio bearer configuration information.

Optionally, the transceiver module 2501 may be further configured to: after the processing module 2502 sets up the first radio bearer based on the radio bearer configuration information, send first computing data to the access network device through the first radio bearer.

For example, the transceiver module 2501 may be further configured to: after the processing module 2502 sets up the first radio bearer based on the radio bearer configuration information, receive, through the first radio bearer, second computing data sent by the access network device.

Optionally, the transceiver module 2501 may be further configured to: after the processing module 2502 sets up the first radio bearer based on the radio bearer configuration information, receive a third message sent by the access network device, where the third message is used to release the first radio bearer. The processing module 2502 may be further configured to release the first radio bearer.

In an example, the transceiver module 2501 may be further configured to: after the processing module 2502 sets up the first radio bearer based on the radio bearer configuration information, receive a fourth message sent by the access network device, where the fourth message is used to deactivate the first radio bearer. The processing module 2502 may be further configured to deactivate the first radio bearer.

For example, the transceiver module 2501 may be further configured to: after the processing module 2502 deactivates the first radio bearer, send a fifth message to the access network device, where the fifth message is used to request the access network device to activate the first radio bearer; and receive a sixth message sent by the access network device, where the sixth message indicates the terminal device to activate the first radio bearer. The processing module 2502 may be further configured to activate the first radio bearer.

Optionally, the transceiver module 2501 may be further configured to: after the processing module 2502 deactivates the first radio bearer, receive a third message sent by the access network device, where the third message indicates the terminal device to release the first radio bearer. The processing module 2502 may be further configured to release the first radio bearer.

For example, the transceiver module 2501 may be further configured to: before the processing module 2502 receives the radio bearer configuration information sent by the access network device, report capability information to the access network device, where the capability information indicates that the terminal device supports the first radio bearer.

In an example, the transceiver module 2501 may be further configured to: before the processing module 2502 reports the capability information to the access network device, receive a seventh message sent by the access network device, where the seventh message is used to enquire whether the terminal device supports the first radio bearer.

For example, the first radio bearer is a CRB.

In a specific implementation, the computing data transmission apparatus may be configured to implement the methods performed by the access network device in the embodiments in FIG. 14 to FIG. 24. The apparatus may be the access network device, or may be a chip, a chip set, or a part, configured to perform a related method function, of a chip in the access network device. The transceiver module 2501 is configured to communicate with a terminal device. The processing module 2502 is configured to: receive, through the transceiver module 2501, a first message sent by the terminal device, where the first message is used to request the access network device to set up a first radio bearer, and the first radio bearer is used to carry computing data; and send a second message to the terminal device through the transceiver module 2501, where the second message carries radio bearer configuration information.

Optionally, the transceiver module 2501 is further configured to: after sending the second message to the terminal device, receive first computing data that is sent by the terminal device through the first radio bearer.

For example, the transceiver module 2501 is further configured to: after sending the second message to the terminal device, send second computing data to the terminal device through the first radio bearer.

Optionally, the transceiver module 2501 is further configured to: after sending the second message to the terminal device, send a third message to the terminal device, where the third message is used to release the first radio bearer.

In an example, the transceiver module 2501 is further configured to: after sending the second message to the terminal device, send a fourth message to the terminal device, where the fourth message is used to deactivate the first radio bearer.

For example, the transceiver module 2501 is further configured to: after sending the fourth message to the terminal device, receive a fifth message sent by the terminal device, where the fifth message is used to request the access network device to activate the first radio bearer; and send a sixth message to the terminal device, where the sixth message indicates the terminal device to activate the first radio bearer.

Optionally, the transceiver module 2501 is further configured to: after sending the fourth message to the terminal device, send a third message to the terminal device, where the third message indicates the terminal device to release the first radio bearer.

Optionally, the transceiver module 2501 is further configured to: before sending the second message to the terminal device, receive capability information reported by the terminal device, where the capability information indicates that the terminal device supports the first radio bearer.

For example, the transceiver module 2501 is further configured to: before receiving the capability information reported by the terminal device, send a seventh message to the terminal device, where the seventh message is used to enquire whether the terminal device supports the first radio bearer.

For example, the first radio bearer is a CRB.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that for functions or implementations of the modules in embodiments of this application, further refer to related descriptions in the method embodiments.

Figure 26:
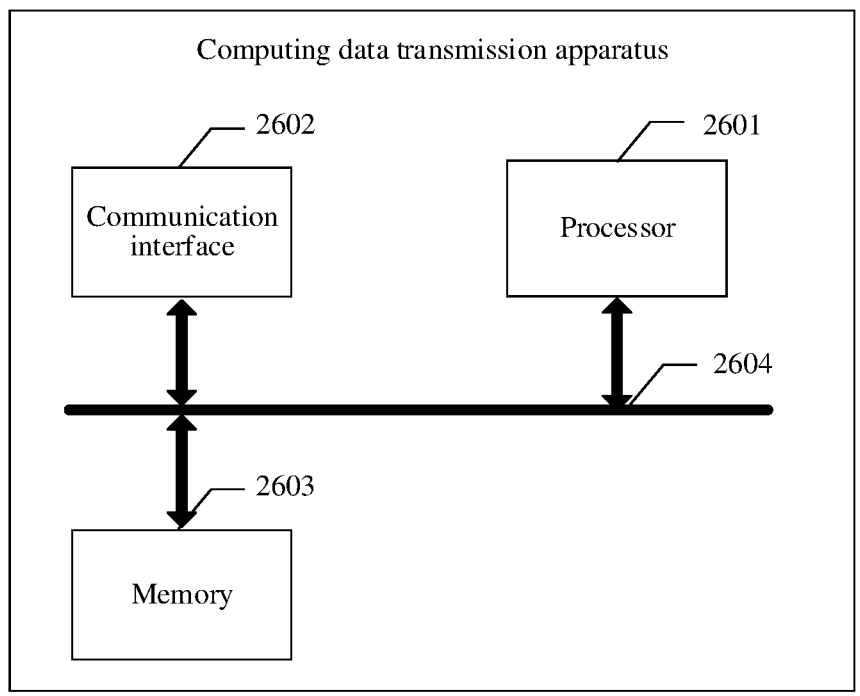
FIG. 26 is a schematic diagram of a structure of another computing data transmission apparatus according to an embodiment of this application.

In a possible manner, the computing data transmission apparatus may be that shown in FIG. 26. The apparatus may be a communication device or a chip in the communication device. The communication device may be a terminal device, or may be an access network device. The apparatus may include a processor 2601, a communication interface 2602, and a memory 2603. The processing module 2502 may be the processor 2601. The transceiver module 2501 may be the communication interface 2602.

The processor 2601 may be a central processing unit (CPU), a digital processing module, or the like. The communication interface 2602 may be a transceiver, an interface circuit such as a transceiver circuit, a transceiver chip, or the like. The apparatus further includes the memory 2603, configured to store a program executed by the processor 2601. The memory 2603 may be a nonvolatile memory such as a hard disk drive (HDD) or a solid-state drive (SSD), or may be a volatile memory such as a random access memory (RAM). The memory 2603 is any other medium that can be configured to carry or store expected program code in a form of instructions or a data structure and that can be accessed by a computer. However, the memory is not limited thereto.

The processor 2601 is configured to execute the program code stored in the memory 2603, and is configured to perform an action of the processing module 2502. Details are not described herein again in this application.

The communication interface 2602 is configured to perform an action of the transceiver module 2501. Details are not described herein again in this application.

A specific connection medium between the communication interface 2602, the processor 2601, and the memory 2603 is not limited in this embodiment of this application. In this embodiment of this application, the memory 2603, the processor 2601, and the communication interface 2602 are connected through a bus 2604 in FIG. 26. The bus is represented by a thick line in FIG. 26. A manner of connection between other components is only an example for description and is not limited thereto. The bus may be classified into an address bus, a data bus, a control bus, and the like. For ease of expression, only a thick line is used to represent the bus in FIG. 26, but this does not mean that there is only one bus or one type of bus.

An embodiment further provides a computer-readable storage medium, configured to store computer software instructions to be executed by the foregoing processor, and the computer-readable storage medium includes a program to be executed by the foregoing processor.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and operations are performed on the computer or the another programmable device, to generate computer-implemented processing. Therefore, the instructions executed on the computer or the another programmable device provide operations for implementing a specific function in one or more processes in the flowcharts and/or in one or more blocks in the block diagrams.

Clearly, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A computing data transmission method, wherein the method comprises:
sending, by a terminal device, a first message to an access network device, wherein the first message requests the access network device to set up a radio bearer configured to carry computing data;
receiving, by the terminal device, a second message sent by the access network device in response to the first message, wherein the second message carries radio bearer configuration information; and
setting up, by the terminal device, the radio bearer based on the radio bearer configuration information,
wherein before the receiving the second message carrying the radio bearer configuration information, the method further comprises:
receiving, by the terminal device, a seventh message sent by the access network device, wherein the seventh message enquires whether the terminal device supports the radio bearer; and
reporting, by the terminal device in response to the seventh message, capability information to the access network device, wherein the capability information includes a one-bit value which indicates that the terminal device supports the radio bearer.

2. The method according to claim 1, wherein after the setting up the radio bearer based on the radio bearer configuration information, the method further comprises:
sending, by the terminal device, first computing data to the access network device through the radio bearer.

3. The method according to claim 1, wherein after the setting up the radio bearer based on the radio bearer configuration information, the method further comprises:
receiving, by the terminal device through the radio bearer, second computing data sent by the access network device.

4. The method according to claim 1, wherein the computing data comprise at least one of:
data describing an artificial intelligence (AI) model,
data generated by an AI model, or
data of a machine learning (ML) model.

5. The method according to claim 1, wherein the first message is a radio resource control (RRC) setup complete (RRCSetupComplete) message.

6. The method according to claim 1, wherein the radio bearer is a computing radio bearer (CRB).

7. A computing data transmission apparatus, wherein the apparatus comprises:
a transceiver;
at least one processor; and
one or more memories coupled to the at least one processor and storing programming instructions executable by the at least one processor to cause the apparatus to:
send a first message to an access network device, wherein the first message requests the access network device to set up a radio bearer configured to carry computing data;
receive a second message sent by the access network device in response to the first message, wherein the second message carries radio bearer configuration information; and
set up the radio bearer based on the radio bearer configuration information,
wherein the programming instructions are executable by the at least one processor to further cause the apparatus to, before receiving the second message carrying the radio bearer configuration information,
receive a seventh message sent by the access network device, wherein the seventh message enquires whether the apparatus supports the radio bearer, and
in response to the seventh message, report capability information to the access network device, wherein the capability information includes a one-bit value which indicates that the apparatus supports the radio bearer.

8. The apparatus according to claim 7, wherein the programming instructions are executable by the at least one processor to further cause the apparatus to:
after setting up the radio bearer based on the radio bearer configuration information, send first computing data to the access network device through the radio bearer.

9. The apparatus according to claim 7, wherein the programming instructions are executable by the at least one processor to further cause the apparatus to:
after setting up the radio bearer based on the radio bearer configuration information,
receive, through the radio bearer, second computing data sent by the access network device.

10. The apparatus according to claim 7, wherein the programming instructions are executable by the at least one processor to further cause the apparatus to:
    after setting up the radio bearer based on the radio bearer configuration information,
    release the radio bearer in response to receiving a third message sent by the access network device, wherein the third message indicates releasing the radio bearer.

11. The apparatus according to claim 7, wherein the radio bearer is a computing radio bearer (CRB).

12. A computing data transmission apparatus, wherein the apparatus comprises:
    a transceiver;
    at least one processor; and
    one or more memories coupled to the at least one processor and storing programming instructions executable by the at least one processor to cause the apparatus to:
        communicate with a terminal device;
        receive a first message sent by the terminal device, wherein the first message requests the apparatus to set up a radio bearer configured to carry computing data; and
        in response to the first message, send a second message to the terminal device, wherein the second message carries radio bearer configuration information of the radio bearer,
    wherein the programming instructions are executable by the at least one processor to further cause the apparatus to, before sending the second message to the terminal device:
        send a seventh message to the terminal device, wherein the seventh message enquires whether the terminal device supports the radio bearer; and
        receive capability information reported by the terminal device in response to the seventh message, wherein the capability information includes a one-bit value which indicates that the terminal device supports the radio bearer.

13. The apparatus according to claim 12, wherein the programming instructions are executable by the at least one processor to further cause the apparatus to:
    after sending the second message to the terminal device, receive first computing data that is sent by the terminal device through the radio bearer.

14. The apparatus according to claim 12, wherein the programming instructions are executable by the at least one processor to further cause the apparatus to:
    after sending the second message to the terminal device, send second computing data to the terminal device through the radio bearer.

15. The apparatus according to claim 12, wherein the programming instructions are executable by the at least one processor to further cause the apparatus to:
    after sending the second message to the terminal device, send a third message to the terminal device, wherein the third message indicates releasing the radio bearer.

16. The apparatus according to claim 12, wherein the computing data comprise at least one of:
    data describing an artificial intelligence (AI) model, data generated by an AI model, or data of a machine learning (ML) model.

17. The apparatus according to claim 12, wherein the first message is a radio resource control (RRC) setup complete (RRCSetupComplete) message.

18. The apparatus according to claim 12, wherein the radio bearer is a computing radio bearer (CRB).

\* \* \* \* \*